United States Patent
Benko et al.

(10) Patent No.: US 9,329,469 B2
(45) Date of Patent: May 3, 2016

(54) PROVIDING AN INTERACTIVE EXPERIENCE USING A 3D DEPTH CAMERA AND A 3D PROJECTOR

(75) Inventors: Hrvoje Benko, Bellevue, WA (US); Ricardo Jorge Jota Costa, Lisbon (PT); Andrew D. Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 13/074,041

(22) Filed: Mar. 29, 2011

(65) Prior Publication Data

US 2012/0212509 A1    Aug. 23, 2012

Related U.S. Application Data

(60) Provisional application No. 61/444,123, filed on Feb. 17, 2011.

(51) Int. Cl.
| | |
|---|---|
| *G06T 19/00* | (2011.01) |
| *G03B 35/00* | (2006.01) |
| *G06F 3/01* | (2006.01) |
| *G06F 3/033* | (2013.01) |
| *G02B 27/01* | (2006.01) |

(Continued)

(52) U.S. Cl.
CPC .............. *G03B 35/00* (2013.01); *G02B 27/017* (2013.01); *G06F 3/01* (2013.01); *G06F 3/033* (2013.01); *G06T 19/006* (2013.01); *H04N 13/004* (2013.01); *H04N 13/0275* (2013.01)

(58) Field of Classification Search
USPC ..................................... 345/419, 420; 348/50
See application file for complete search history.

(56) References Cited

U.S. PATENT DOCUMENTS

| | | |
|---|---|---|
| 4,402,608 A | 9/1983 | DiMatteo et al. |
| 4,786,966 A | 11/1988 | Hanson et al. |

(Continued)

FOREIGN PATENT DOCUMENTS

| | | |
|---|---|---|
| CN | 1378741 A | 11/2002 |
| EP | 1600902 A | 11/2005 |

(Continued)

OTHER PUBLICATIONS

International Search Report and Written Opinion for International Application Serial No. PCT/US2012/024786, mailed on Oct. 18, 2012, 8 pages.

(Continued)

*Primary Examiner* — Kimbinh T Nguyen
(74) *Attorney, Agent, or Firm* — Alin Corie; Sandy Swain; Micky Minhas

(57) ABSTRACT

An interaction system is described which uses a depth camera to capture a depth image of a physical object placed on, or in vicinity to, an interactive surface. The interaction system also uses a video camera to capture a video image of the physical object. The interaction system can then generate a 3D virtual object based on the depth image and video image. The interaction system then uses a 3D projector to project the 3D virtual object back onto the interactive surface, e.g., in a mirrored relationship to the physical object. A user may then capture and manipulate the 3D virtual object in any manner. Further, the user may construct a composite model based on smaller component 3D virtual objects. The interaction system uses a projective texturing technique to present a realistic-looking 3D virtual object on a surface having any geometry.

20 Claims, 15 Drawing Sheets

(51) Int. Cl.
*H04N 13/00* (2006.01)
*H04N 13/02* (2006.01)

(56) References Cited

U.S. PATENT DOCUMENTS

| | | |
|---|---|---|
| 5,552,839 A | 9/1996 | Kuhl |
| 5,714,997 A | 2/1998 | Anderson |
| 5,870,136 A | 2/1999 | Fuchs et al. |
| 6,009,359 A | 12/1999 | El-Hakim et al. |
| 6,252,579 B1 | 6/2001 | Rosenberg et al. |
| 6,369,805 B1 | 4/2002 | Kuzunuki et al. |
| 6,431,711 B1 | 8/2002 | Pinhanez |
| 6,542,154 B1* | 4/2003 | Knittel ............ 345/427 |
| 6,570,566 B1* | 5/2003 | Yoshigahara ........ 345/427 |
| 7,027,040 B2 | 4/2006 | Rekimoto et al. |
| 7,027,659 B1* | 4/2006 | Thomas ............ 382/254 |
| 7,069,516 B2 | 6/2006 | Rekimoto |
| 7,164,789 B2 | 1/2007 | Chen et al. |
| 7,182,465 B2 | 2/2007 | Fuchs et al. |
| 7,199,793 B2* | 4/2007 | Oh et al. ........... 345/419 |
| 7,204,428 B2 | 4/2007 | Wilson |
| 7,242,818 B2 | 7/2007 | Beardsley et al. |
| 7,260,474 B1 | 8/2007 | Thayathil et al. |
| 7,348,963 B2* | 3/2008 | Bell ............... 345/156 |
| 7,379,047 B2 | 5/2008 | Drucker et al. |
| 7,394,459 B2 | 7/2008 | Bathiche et al. |
| 7,479,967 B2 | 1/2009 | Bachelder et al. |
| 7,576,727 B2* | 8/2009 | Bell ............... 345/158 |
| 7,599,561 B2 | 10/2009 | Wilson et al. |
| 7,747,067 B2 | 6/2010 | Popescu et al. |
| 7,812,815 B2 | 10/2010 | Banerjee et al. |
| 7,843,449 B2* | 11/2010 | Krah ............... 345/419 |
| 7,942,530 B2 | 5/2011 | Majumder et al. |
| 8,035,614 B2 | 10/2011 | Bell et al. |
| 8,068,095 B2 | 11/2011 | Pryor |
| 8,130,330 B2 | 3/2012 | Tan et al. |
| 8,427,424 B2 | 4/2013 | Hartmann et al. |
| 8,570,320 B2* | 10/2013 | Izadi et al. ......... 345/420 |
| 8,570,423 B2* | 10/2013 | Robinson et al. ..... 348/333.01 |
| 9,137,511 B1 | 9/2015 | LeGrand, III |
| 2001/0035845 A1 | 11/2001 | Zwern |
| 2001/0044858 A1 | 11/2001 | Rekimoto |
| 2001/0048429 A1 | 12/2001 | Liao et al. |
| 2002/0105623 A1 | 8/2002 | Pinhanez |
| 2002/0158873 A1 | 10/2002 | Williamson |
| 2003/0020707 A1 | 1/2003 | Kangas et al. |
| 2003/0034976 A1 | 2/2003 | Raskar et al. |
| 2003/0042401 A1* | 3/2003 | Gartner et al. ......... 250/208.1 |
| 2003/0071784 A1 | 4/2003 | Sato et al. |
| 2003/0227470 A1 | 12/2003 | Gene et al. |
| 2004/0037450 A1* | 2/2004 | Bradski ............ 382/103 |
| 2004/0046711 A1 | 3/2004 | Triebfuerst |
| 2004/0046736 A1 | 3/2004 | Pryor et al. |
| 2004/0102247 A1 | 5/2004 | Smoot |
| 2004/0183775 A1 | 9/2004 | Bell |
| 2004/0257540 A1 | 12/2004 | Roy et al. |
| 2005/0099603 A1 | 5/2005 | Thomas et al. |
| 2005/0135670 A1 | 6/2005 | Vaidyanathan |
| 2005/0185150 A1 | 8/2005 | Turner et al. |
| 2006/0001645 A1 | 1/2006 | Drucker et al. |
| 2006/0001650 A1 | 1/2006 | Robbins et al. |
| 2006/0036944 A1 | 2/2006 | Wilson |
| 2006/0109239 A1 | 5/2006 | Hsiung |
| 2006/0158452 A1 | 7/2006 | Borger et al. |
| 2006/0294247 A1 | 12/2006 | Hinkley et al. |
| 2007/0013716 A1 | 1/2007 | Kjeldsen et al. |
| 2007/0055782 A1 | 3/2007 | Wright et al. |
| 2007/0124370 A1 | 5/2007 | Nareddy et al. |
| 2007/0126864 A1 | 6/2007 | Bhat |
| 2007/0126938 A1 | 6/2007 | Tan et al. |
| 2007/0132733 A1 | 6/2007 | Ram |
| 2007/0247422 A1 | 10/2007 | Vertegaal et al. |
| 2007/0299338 A1 | 12/2007 | Stevick et al. |
| 2008/0002262 A1 | 1/2008 | Chirieleison |
| 2008/0007567 A1* | 1/2008 | Clatworthy et al. ...... 345/619 |
| 2008/0031327 A1 | 2/2008 | Wang et al. |
| 2008/0095468 A1 | 4/2008 | Klemmer et al. |
| 2008/0180402 A1 | 7/2008 | Yoo et al. |
| 2008/0199071 A1 | 8/2008 | Gu |
| 2008/0214233 A1 | 9/2008 | Wilson et al. |
| 2008/0229194 A1 | 9/2008 | Boler et al. |
| 2008/0231634 A1 | 9/2008 | Gyde et al. |
| 2008/0246781 A1 | 10/2008 | Surati et al. |
| 2008/0263458 A1 | 10/2008 | Altberg et al. |
| 2008/0285843 A1 | 11/2008 | Lim |
| 2008/0316201 A1* | 12/2008 | Nayar et al. ......... 345/419 |
| 2009/0027330 A1 | 1/2009 | Aida |
| 2009/0037841 A1 | 2/2009 | Bell et al. |
| 2009/0091581 A1 | 4/2009 | Lapa |
| 2009/0109280 A1* | 4/2009 | Gotsman et al. ........ 348/39 |
| 2009/0124379 A1 | 5/2009 | Wells |
| 2009/0128783 A1 | 5/2009 | Shih et al. |
| 2009/0143141 A1 | 6/2009 | Wells et al. |
| 2009/0149250 A1 | 6/2009 | Middleton |
| 2009/0167966 A1 | 7/2009 | Nam et al. |
| 2009/0215533 A1* | 8/2009 | Zalewski et al. ........ 463/32 |
| 2009/0217187 A1* | 8/2009 | Kendall et al. ........ 715/765 |
| 2009/0237564 A1 | 9/2009 | Kikinis et al. |
| 2009/0244309 A1* | 10/2009 | Maison et al. ........ 348/222.1 |
| 2010/0037273 A1 | 2/2010 | Dressel et al. |
| 2010/0073366 A1* | 3/2010 | Tateno ............. 345/419 |
| 2010/0073476 A1 | 3/2010 | Liang et al. |
| 2010/0103196 A1 | 4/2010 | Kumar et al. |
| 2010/0103386 A1 | 4/2010 | Kubota |
| 2010/0128112 A1 | 5/2010 | Marti et al. |
| 2010/0164990 A1 | 7/2010 | Van Doorn et al. |
| 2010/0182416 A1 | 7/2010 | Holmgren et al. |
| 2010/0194863 A1* | 8/2010 | Lopes et al. .......... 348/50 |
| 2010/0194872 A1 | 8/2010 | Mathe et al. |
| 2010/0199230 A1 | 8/2010 | Latta et al. |
| 2010/0201878 A1 | 8/2010 | Barenbrug et al. |
| 2010/0201894 A1 | 8/2010 | Nakayama et al. |
| 2010/0225743 A1* | 9/2010 | Florencio et al. ........ 348/46 |
| 2010/0281432 A1 | 11/2010 | Geisner et al. |
| 2010/0315491 A1* | 12/2010 | Carter et al. ......... 348/51 |
| 2010/0330843 A1 | 12/2010 | Gao et al. |
| 2011/0018903 A1* | 1/2011 | Lapstun et al. ........ 345/633 |
| 2011/0025689 A1* | 2/2011 | Perez et al. .......... 345/420 |
| 2011/0058709 A1 | 3/2011 | Kipman et al. |
| 2011/0107216 A1 | 5/2011 | Bi |
| 2011/0205242 A1 | 8/2011 | Friesen |
| 2011/0205341 A1* | 8/2011 | Wilson et al. ......... 348/51 |
| 2011/0216948 A1* | 9/2011 | Yalla et al. .......... 382/125 |
| 2011/0234481 A1 | 9/2011 | Katz et al. |
| 2011/0263326 A1 | 10/2011 | Gagner et al. |
| 2011/0304691 A1* | 12/2011 | Newton et al. ......... 348/43 |
| 2011/0316845 A1 | 12/2011 | Roberts et al. |
| 2012/0086624 A1 | 4/2012 | Thompson et al. |
| 2012/0105585 A1* | 5/2012 | Masalkar et al. ........ 348/46 |
| 2012/0113223 A1 | 5/2012 | Hilliges et al. |
| 2012/0117514 A1* | 5/2012 | Kim et al. ........... 715/849 |
| 2012/0140038 A1* | 6/2012 | Bi et al. ............. 348/46 |
| 2012/0154277 A1 | 6/2012 | Bar-Zeev et al. ....... 345/158 |
| 2012/0154619 A1* | 6/2012 | Lee ............... 348/222.1 |
| 2012/0157204 A1 | 6/2012 | Kelsey et al. |
| 2012/0162254 A1 | 6/2012 | Anderson et al. |
| 2012/0194516 A1 | 8/2012 | Newcombe et al. |
| 2012/0194517 A1* | 8/2012 | Izadi et al. .......... 345/420 |
| 2012/0212509 A1* | 8/2012 | Benko et al. ......... 345/633 |
| 2012/0223885 A1 | 9/2012 | Perez |
| 2012/0223909 A1* | 9/2012 | Tse et al. ........... 345/174 |
| 2012/0264510 A1 | 10/2012 | Wigdor et al. |
| 2012/0268570 A1 | 10/2012 | Trumbull |
| 2012/0274745 A1 | 11/2012 | Russell |
| 2012/0293548 A1 | 11/2012 | Perez et al. |
| 2013/0002815 A1* | 1/2013 | Smoot et al. .......... 348/43 |
| 2013/0069985 A1 | 3/2013 | Wong et al. |
| 2013/0147686 A1 | 6/2013 | Clavin et al. |
| 2013/0187835 A1 | 7/2013 | Vaught et al. |
| 2013/0229353 A1 | 9/2013 | Hartmann et al. |
| 2013/0336629 A1 | 12/2013 | Mulholland et al. |

(56) References Cited

U.S. PATENT DOCUMENTS

| | | | |
|---|---|---|---|
| 2014/0125785 A1 | 5/2014 | Na et al. | |
| 2015/0049001 A1 | 2/2015 | Rahman et al. | |

FOREIGN PATENT DOCUMENTS

| | | | |
|---|---|---|---|
| JP | 04-056993 | A | 2/1992 |
| JP | 04-328627 | | 11/1992 |
| JP | 07-168949 | | 7/1995 |
| JP | 09-046776 | | 2/1997 |
| JP | 2001-175374 | | 6/2001 |
| JP | 2001-175374 | A | 6/2001 |
| JP | 2006-148730 | | 6/2006 |
| JP | 2007-226406 | | 9/2007 |
| JP | 2008-033844 | A | 2/2008 |
| JP | 2008-112077 | | 5/2008 |
| KR | 1020020040773 | A | 5/2002 |
| KR | 100811015 | B1 | 11/2008 |
| WO | 2005017739 | A1 | 2/2005 |
| WO | 2006105686 | A | 10/2006 |
| WO | 2007134456 | A1 | 11/2007 |
| WO | 2009069958 | A2 | 6/2009 |
| WO | 2010019802 | A1 | 2/2010 |

OTHER PUBLICATIONS

Lavoie, et al., "Constructing 3D Virtual Reality Objects from 2D Images of Real Objects Using NURBS," retrieved at <<http://ieeexplore.ieee.org/stamp/stamp.jsp?tp=&arnumber=4373940>>, Proceedings of the IEEE International Conference on Virtual Environments, Human-Computer Interfaces, and Measurement Systems, Jun. 2007, pp. 117-124.

Koike, et al., "Integrating Paper and Digital Information on EnhancedDesk: A Method for Realtime Finger Tracking on an Augmented Desk System," retrieved at <<http://www.hci.iis.u-tokyo.ac.jp/~ysato/papers/Koike-TOCHI01.pdf>>, ACM Transactions on Computer-Human Interaction, vol. 8, No. 4, Dec. 2001, pp. 307-322.

Ullmer, et al., "The metaDESK: Models and Prototypes for Tangible User Interfaces," retrieved at <<http://tangible.media.mit.edu/content/papers/pdf/metaDESK_UIST97.pdf>>, Proceedings of the 10th Annual ACM Symposium on User Interface Software and Technology, 1997, 10 pages.

Rosenblum, Lawrence, J. "Applications of the Responsive Workbench," retrieved at <<http://ieeexplore.ieee.org/stamp/stamp.jsp?tp=&arnumber=595260>>, IEEE Computer Graphics and Applications, vol. 17, No. 4, 1997, pp. 10-15.

Dias, et al., "Tangible Interaction for Conceptual Architectural Design," retrieved at <<http://ieeexplore.ieee.org/stamp/stamp.jsp?tp=&arnumber=1106951>>, The First IEEE International Workshop on Augmented Reality Toolkit, 2002, pp. 1-9.

Anderson, et al., "Tangible Interaction + Graphical Interpretation: a New Approach to 3D Modeling," retrieved at <<http://www.merl.com/papers/docs/TR2000-13.pdf>>, Mitsubishi Electric Information Technology Center America, Technical Report No. TR-2000-13, 2000, Cambridge, MA, in Proceedings of the 27th Annual Conference on Computer Graphics and Interactive Techniques, 12 pages.

Fitzmaurice, et al., "Bricks: Laying the Foundations for Graspable User Interfaces," retrieved at <<http://tangible.media.mit.edu/content/papers/pdf/bricks-chi95.pdf>>, Proceedings of the SIGCHI Conference on Human Factors in Computing Systems, 1995, 8 pages.

Grossman, et al., "An Interface for Creating and Manipulating Curves Using a High Degree-of-freedom Curve Input Device," retrieved at <<http://www.dgp.toronto.edu/~ravin/papers/chi2003_curvemanipulation.pdf>>, Proceedings of the SIGCHI Conference on Human Factors in Computing Systems, 2003, 8 pages.

Kitamura, et al., "Real-time 3D Interaction with ActiveCube," retrieved at <<http://citeseerx.ist.psu.edu/viewdoc/download?doi=10.1.1.22.9277&rep=rep1&type=pdf>>, CHI '01 Extended Abstracts on Human Factors in Computing Systems, 2001, pp. 355-356.

Segal, et al., "Fast Shadows and Lighting Effects Using Texture Mapping," retrieved at <<http://citeseerx.ist.psu.edu/viewdoc/download;jsessionid=6AE93E7F6606B33EF469C462791D8A58?doi=10.1.1.66.4231&rep=rep1&type=pdf>>, Proceedings of the 19th Annual Conference on Computer Graphics and Interactive Techniques, 1992, pp. 249-252.

Piper, et al., "Illuminating Clay: A 3-D Tangible Interface for Landscape Analysis," retrieved at <<http://citeseerx.ist.psu.edu/viewdoc/download?doi=10.1.1.16.5243&rep=rep1&type=pdf>>, Proceedings of the SIGCHI Conference on Human Factors in Computing Systems, 2002, 8 pages.

Raffle, et al., "Topobo: A Constructive Assembly System with Kinetic Memory," retrieved at <<http://citeseerx.ist.psu.edu/viewdoc/download?doi=10.1.1.115.7109&rep=rep1&type=pdf>>, Proceedings of the SIGCHI Conference on Human Factors in Computing Systems, 2004, 8 pages.

Starner, et al., "The Perceptive Workbench: Computer-vision-based Gesture Tracking, Object Tracking, and 3D Reconstruction for Augmented Desks," retrieved at <<http://www.amyhurst.com/publications/starner-perceptive-mva03.pdf>>, Machine Vision and Applications, vol. 14, Springer-Verlag, 2003, pp. 59-71.

Wilson, et al., "Combining Multiple Depth Cameras and Projectors for Interactions On, Above and Between Surfaces," retrieved at <<http://www.acm.org>>, Proceedings of the 23nd Annual ACM Symposium on User interface Software and Technology, pp. 273-282.

Hosokawa, et al., "Tangible Design Support System Using RFID Technology," retrieved at <<http://www.acm.org>>, Proceedings of the 2nd International Conference on Tangible and Embedded Interaction, 2008, pp. 75-78.

Wilson, et al., "Bringing Physics to the Surface," retrieved at <<http://www.acm.org>>, Proceedings of the 21st Annual ACM Symposium on User Interface Software and Technology, 2008, pp. 67-76.

Wilson, Andrew A., "Simulating Grasping Behavior on an Imaging Interactive Surface," retrieved at <<http://www.acm.org>>, Proceedings of the ACM International Conference on Interactive Tabletops and Surfaces, 2009, pp. 125-132.

Hilliges, et al., "Interactions in the Air: Adding Further Depth to Interactive Tabletops," retrieved at <<http://www.acm.org>>, Proceedings of the 22nd Annual ACM Symposium on User interface Software and Technology, 2009, pp. 139-148.

Leibe, et al., "The Perceptive Workbench: Towards Spontaneous and Natural Interaction in Semi-Immersive Virtual Environments," retrieved at <<http://smartech.gatech.edu/bitstream/handle/1853/3400/99-33.pdf?sequence=1>>, Technical Report No. GIT-GVU-99-33, Georgia Institute of Technology, 1999, 9 pages.

Leibe, et al., "Toward Spontaneous Interaction with the Perceptive Workbench," retrieved at <<http://www.cc.gatech.edu/~thad/p/journal/toward-spontaneous-ineraction-with-the-perceptive-workbench.pdf>>, IEEE Computer Graphics and Applications, 2000, 12 pages.

Everitt, Cass, "Projective Texture Mapping," retrieved at <<http://developer.nvidia.com/object/Projective_Texture_Mapping.html>>, Nvidia, Santa Clara, CA, 2001, 7 pages.

Billinghurst, et al., "Tangible Augmented Reality," retrieved at <<http://www.acm.org>>, ACM Special Interest Group on Computer Graphics and Interactive Techniques, 2008, 10 pages.

"Physics engine," retrieved at <<http://en.wikipedia.org/wiki/Physics_engine>>, Wikipedia entry, retrieved on Mar. 9, 2011, 7 pages.

"Dynamical simulation," retrieved at <<http://en.wikipedia.org/wiki/Dynamical_simulation>>, Wikipedia entry, retrieved on Mar. 9, 2011, 4 pages.

Search Report and Written Opinion for PCT/US2009/054607, international filing date Aug. 21, 2009, mailing date Apr. 6, 2010, 11 pages.

Office Action for CN Application/Patent No: 201180010523.9, entitled "Projectors and Depth Cameras for Deviceless Augmented Reality and Interaction," dated Jun. 20, 2013, with English translation, 24 pages.

Wilson, Andrew D., "Depth-Sensing Video Cameras for 3D Tangible Tabletop Interaction", In Proceedings of the 2nd IEEE International Workshop on Horizontal Interactive Human-Computer Systems (Tabletop), 2007.

(56) References Cited

OTHER PUBLICATIONS

Henrysson, et al., "Face to face collaborative AR on mobile phones," Proceedings. Fourth IEEE and ACM International Symposium on Mixed and Augmented Reality, Oct. 2005, 11 pages.
Tang, et al., "Augmented Reality Systems for Medical Applications", Retrieved at <<http://ieeexplore.ieee.org/stamp/stamp.jsp?tp=&arnumber=677169&isnumber=14884 >>, IEEE Engineering in Medicine and Biology Magazine, May-Jun. 1998, pp. 49-58.
Dodds, et al., "A Communication Task in HMO Virtual Environments: Speaker and Listener Movement", Proceedings of the 23rd Annual Conference on Computer Animation and Social Agents {CASA), 2010, pp. 4.
Cotting, et al., "Adaptive Instant Displays: Continuously Calibrated Projections Using Per-Pixel Light Control." Computer Graphics Forum, 2005, vol. 24: 705-714.
"International Search Report and Written Opinion for PCT Application No. PCT/US2009/054607", Filed Date: Aug. 21, 2009, Mailed Date Apr. 6, 2010, 11 pages.
El-Hakim, et al., "Sensor Based Creation of Indoor Virtual Environment Models", Proceedings of the 1997 International Conference on Virtual Systems and MultiMedia, Sep. 10-12, 1997, 9 Pages.
Hu, et al., "Sensors and Data Fusion Algorithms in Mobile Robotics", Research report CSM422 University of Essex, Jan. 10, 2005, pp. 1-12.
Boverie, et al., "Comparison of structured light and stereovision sensors for new airbag generations", Retrieved at <<http://homepages.laas.fr/lerasle/pdr/cep03.pdf>>, vol. 11, No. 12, Dec. 2003, pp. 1413-1421.
Leiva, et al., 3D reconstruction of a static Indoor environment by fusion of sonar and video data, Retrieved at <<http://webpersonal.uma.es/~EPEREZ/flles/SIRS01.pdf>>, Retrieved Date: Mar. 15, 2011, pp. 10.
Sequeira, et al., "3D Reconstruction of Indoor Environments", Proceedings of International Conference on Image Processing, vol. 2, Sep. 16-19, 1996, pp. 4.
El-Hakim, et al., "Two 3-D Sensors for Environment Modeling and Virtual Reality: Calibration and Multi-View Registration", Proceedings of International Archives on Photogrammetry and Remote Sensing, vol. 35, 1996, pp. 10.
Scheibe, et al., "Data Fusion and Visualization of Panoramic Images and laser Scans", Retrieved at <<http://www.dir.de/os/Portaldata/48/Resources/dokumente/projekte/pancam_laser.pdf. >>, Retrieved Date: Mar. 15, 2011, pp. 3.
Tedesco, et al., "Integrated Virtual Environment", U.S. Appl. No. 13/084,786, filed Apr. 12, 2011, pp. 1-28.
Wilson, et al., "Providing an Interactive Experience Using a 3D Depth Camera and a 3D Projector", U.S. Appl. No. 13/074,041, filed Mar. 29, 2011, pp. 1-43.
Baribeau, et al., "Color Reflectance Modeling Using a Polychromatic Laser Range Sensor", IEEE Transactions on Pattern Analysis and Machine Intelligence vol. 14 No. 2, Feb. 1992, 7 pages.
Manabe, et al., "Three Dimensional Measurement using Color Structured Patterns and Imaging Spectrograph", Proceedings 16th International Conference on Pattern Recognition, vol. 3, Dec. 10, 2002, 4 pages.
Song, et al., "Use of LCD Panel for Calibrating Structured-Light-Based Range Sensing System", IEEE Transactions on Instrumentation and Measurement, vol. 57, No. 11, Oct. 10, 2008, 8 Pages.
Bishop, Todd, "Q&A: Microsoft LightSpace, One Step Closer to Star Trek Holodeck", Retrieved at <<http://www.techflash.com/seattle/2010/ 1O/qa_microsoft_lightspace_one_step_closer_to_star_trek_holodeck.htm l>>, Oct. 7, 2010, 4 Pages.
"I-Cocoon: The Next Wii?", Retrieved at <<http://www.dailygame.net/news/archives/008261.php>>, Nov. 9, 2008, 4 Pages.
"Structured Light 3D Scanning", Retrieved at <<http://sites.google.com/site/structuredlight/techniques>>, Nov. 26, 2010, 3 Pages.
"International Search Report and Written Opinion", Mailed Date: Sep. 28, 2012, Application No. PCT/US2012/026823, Filed Date: Feb. 27, 2012, 6 Pages.

"Liquid Crystal Shutter Glasses", Retrieved at <<http://en.wikipedia.org/wiki/Active_shutter_glasses >>, Retrieved Date: Apr. 8, 2011, 6 pages.
"Stereoscopy", Retrieved at <<http://enwikipedia.org/wiki/Stereoscopy >>, Retrieved Date: Apr. 8, 2011, 21 pages.
Ashdown, et al., "Steerable Projector Calibration," IEEE Computer Society Conference on Computer Vision and Pattern Recognition-Workshops, Jun. 2005, 8 pages.
City Theatrical, Inc., "AutoYoke The First Automated Lighting Solution Designed for Theatrical Use", citytheatrical.com/rcyoke.htm, Accessed: Feb. 19, 2013, 2 pages.
Benko, et al., "Multi-Point Interactions with Immersive Omnidirectional Visualizations in a Dome," ACM International Conference on Interactive Tabletops and Surfaces, Nov. 2010, 10 pages.
Benko, et al., "MirageTable: Freehand Interaction on a Projected Augmented Reality Tabletop," Proceedings of the SIGCHI Conference on Human Factors in Computing Systems, May 2012, 10 pages.
Bimber, et al., "Spatial Augmented Reality: Merging Real and Virtual Worlds", Wellesley: AK Peters, Ltd., Jul. 2005.
Bilinghurst, et al., "Shared Space: An Augmented Reality Approach for Computer Supported Collaborative Work", Virtual Reality vol. 3, No. 1, Mar. 1998, pp. 25-36.
Bolt, Richard A., "Put-That-There": Voice and Gesture at the Graphics Interface, SIGGRAPH '80 Proceedings of the 7th Annual Conference on Computer Graphics and Interactive Techniques, Jul. 1980, 9 pages.
Borkowski, et al., "Spatial Control of Interactive Surfaces in an Augmented Environment," Proceedings of the 2004 International Conference on Engineering Human Computer Interaction and Interactive Systems, Jul. 2004, 16 pages.
Butz, et al., "Applying the Peephole Metaphor in a Mixed-Reality Room," Computer Graphics and Applications, vol. 26, No. 1, Jan. 2006, 8 pages.
Butz, et al., "Searchlight—A Lightweight Search Function for Pervasive Environments," Proceedings of the Second International Conference on Pervasive Computing, Apr. 2004, 6 pages.
Cao, et al., "Multi-User Interaction Using Handheld Projectors," Proceedings of the 2oth Annual ACM Symposium on User Interface Software and Technology, Oct. 2007, 10 pages.
Ehnes, et al., "Projected Augmentation—Augmented Reality Using Rotatable Video Projectors," Third IEEE and ACM International Symposium on Mixed and Augmented Reality, Nov. 5, 2004, 10 pages.
Harrison, et al., "OmniTouch: Wearable Multitouch Interaction Everywhere," Proceedings of the 24th Annual ACM Symposium on User Interface Software and Technology, Oct. 2011, 10 pages.
Izadi, et al., "KinectFusion: Real-time 3D Reconstruction and Interaction Using a Moving Depth Camera," Proceedings of the 24th Annual ACM Symposium on User Interface Software and Technology, Oct. 2011, 10 pages.
Kjeldsen, et al., "Interacting with Steerable Projected Displays," Proceedings of the Fifth IEEE International Conference on Automatic Face and Gesture Recognition, May 21, 2002, 6 pages.
Levy, Steven, "Google Gets Transparent with Glass, Its Augmented Reality Project," http://www.wired.com/business/2012/04/epicenter-google-glass-ar/, Apr. 4, 2012, 11 pages.
"Microsoft Office Labs," Microsoft, http://www.microsoft.com/office/I abs/index.html, Accessed: Feb. 19, 2013, 8 pages.
Molyneaux, et al., "Cooperative Augmentation of Smart Objects with Projector-Camera Systems," The 9th International Conference on Ubiquitous Computing, Sep. 2007, 18 pages.
Molyneaux, et al., "Interactive Environment-Aware Handheld Projectors for Pervasive Computing Spaces," Proceedings of the 1oth International Conference on Pervasive Computing, Jun. 2012, 18 pages.
"Newton Game Dynamics," Newton Game Dynamics, newtondynamics.com/forum/newton.php, Accessed: Feb. 19, 2013, 2 pages.
Ngan, et al., "Calibrating a Pan-Tilt Camera Head," Image and Vision Computing Workshop, Dec. 1995, 6 pages.
Pinhanez, Claudio, "Augmenting Reality with Projected Interactive Displays," Proceedings of the International Symposium on Virtual and Augmented Architecture, Jun. 2001, 9 pages.

(56) References Cited

OTHER PUBLICATIONS

Pinhanez, Claudio, "The Everywhere Displays Projector: A Device to Create Ubiquitous Graphical Interfaces," The 3rd International Conference on Ubiquitous Computing, Sep. 2001, 18 pages.
Raskar, et al., "ilamps: Geometrically Aware and Self-Configuring Projectors," SIGGRAPH '06 Special Interest Group on Computer Graphics and Interactive Techniques Conference, Jul. 2006, 10 pages.
Raskar, et al., "The Office of the Future: A Unified Approach to Image-Based Modeling and Spatially Immersive Displays." Proceedings of the 25th Annual Conference on Computer Graphics and Interactive Techniques, Jul. 1998, 10 pages.
Raskar, et al., "Multi-Projector Displays Using Camera-Based Registration", Visualization'99, Oct. 1999, 9 pages.
Raskar, et al., "Shader lamps: Animating Real Objects with Image-Based Illumination", Rendering Techniques, Jun. 2001, 10 pages.
Sodhi, et al., "Kinect-Projector Calibration", CS 498 Computational Photography—Final Project, University of Illinois at Urbana-Champaign, Dec. 14, 2010, 11 pages.
Sodhi, et al., "Lightguide: Projected Visualizations for Hand Movement Guidance", Proceedings of the SIGCHI conference on Human Factors in Computing Systems, May 2012, 10 pages.
"Great Films Fill Rooms", Sony Entertainment Network, http://greatfilmsfillrooms.com/en/, Accessed Feb. 19, 2013, 1 page.
Tsai, et al., "A New Technique for Fully Autonomous and Efficient 3D Robotics Hand/Eye Calibration", IEEE Transactions on Robotics and Automation, vol. 5, No. 3, Jun. 1989, pp. 345-358.
Underkoffler, et al., "Emancipated Pixels: Real-World Graphics in the Luminous Room", Proceedings of the 26th Annual Conference on Computer Graphics and Interactive Techniques, ACM Press/Addison-Wesley Publishing Co., Aug. 1999, 8 pages.
Willis, et al, "SideBySide: Ad-hoc Multi-user Interaction with Handheld Projectors." Proceedings of the 24th Annual ACM Symposium on User Interface Software and Technology, ACM, Oct. 2011, 10 pages.
Wilson, et al., "Steerable Augmented Reality with the Beamatron", Proceedings of the 25th Annual ACM Symposium on User Interface Software and Technology, Oct. 2012, 10 pages.
Wilson, et al., "Steerable Augmented Reality with the Beamatron", http://research.microsoft.com/en-us/um/ people/awilson/publications/WilsonUIST2012/WilsonUIST2012.html, Oct. 2012, 1 page.
Zhang, Zhengyou, "A Flexible New Technique for Camera Calibration", Pattern Analysis and Machine Intelligence, vol. 22, No. 11, Nov. 2000, pp. 1330-1334.
Cauchard, et al., "Steerable Projection: Exploring Alignment in Interactive Mobile Displays", Personal and Ubiquitous Computing, vol. 16, No. 1, Jan. 2012, pp. 27-37.
Luus, et al., "Optimization by Direct Search and Systematic Reduction of the Size of Search Region". American Institute of Chemical Engineering Journal, vol. 19, No. 4, Jul. 1973, pp. 760-766.
Ates, et al., "Immersive Simulation of Visual Impairments Using a Wearable See-through Display", In Proceedings of the 8th International Conference on Tangible, Embedded and Embodied Interaction, Feb. 16, 2014, 4 pages.
Benko, et al., "Dyadic Projected Spatial Augmented Reality", In Proceedings of the 27th annual ACM symposium on User interface software and technology, Oct. 7, 2012, 11 pages.
Leibe, et al", "The Perceptive Workbench: Toward Spontaneous and Natural Interaction in Semi-Immersive Virtual Environments, Proceedings of the IEEE Virtual Reality 2000 Conference, 2000, 4 pages.
"Voluntary Amendment for Chinese Patent Application No. 201210037656.5", Filed May 29, 2014.
"Restriction Requirement for U.S Appl. No. 12/241,281", Mailed Date: Jun. 21, 2011, 7 pages.
"Response to Restriction Requirement for U.S. Appl. No. 12/241,281", Mailed Date: Jun. 21, 2011, Filed Date: Jul. 20, 2011, 7 pages.
"Non-Final Office Action for U.S. Appl. No. 12/241,281", Mailed Date: Aug. 25, 2011, 26 pages.
"Response to Non-Final Office Action for U.S. Appl. No. 12/241,281", Mailed Date: Aug. 25, 2011, Filed Date: Nov. 2, 2011, 13 pages.
"Final Office Action for U.S. Appl. No. 12/241,281", Mailed Date: Jan. 6, 2012, 27 pages.
"Request for Continued Examination and Response to Final Office Action for U.S. Appl. No. 12/241,281", Mailed Date: Jan. 6, 2012, Filed Date: May 2, 2012, 14 pages.
"Non-Final Office Action for U.S. Appl. No. 12/241,281", Mailed Date: Jul. 20, 2012, 21 pages.
"Response to Non-Final Office Action for U.S. Appl. No. 12/241,281", Mailed Date: Oct. 22, 2012, 13 pages.
"Notice of Allowance for U.S. Appl. No. 12/241,281", Mailed Date: Dec. 24, 2012, 10 pages.
U.S. Appl. No. 12/241,281—Applicant Initiated Interview Summary Mailed Nov. 9, 2011, 3 pages.
U.S. Appl. No. 12/241,281—Applicant Initiated Interview Summary Mailed Sep. 20, 2012, 3 pages.
"First Office Action for CN Patent Application No. 200980139375.3", Mailed Date: Dec. 18, 2012, 14 pages.
"Response to First Office Action for CN Patent Application No. 200980139375.3", Mailed Date: Dec. 18, 2012, Filed Date: Apr. 19, 2013, 14 pages.
"Second Office Action for CN Patent Application No. 2009801393753", Mailed Date: Aug. 7, 2013, 11 pages.
"Response to Second Office Action for CN Patent Application No. 2009801393753", Mailed Date: Aug. 7, 2013, Filed Date: Aug. 30, 2013, 15 pages.
"Third and Final Office Action for CN Patent Application No. 200980139375.3", Mailed Date: Jan. 8, 2014, 10 pages.
"Notice of Reexamination for CN Application No. 200980139375.3", Mailed Date: Aug. 7, 2014, 5 pages.
"Decision of Reexamination for CN Application No. 200980139375.3", Mailed Date: Jan. 28, 2015, 11 pages.
China Patent Application No. CN 200980139375.3—Notice of Allowance with Allowed Claims, Mailed Mar. 2, 2015, 7 pages.
"First Office Action for JP Patent Application No. 2011-530082", Mailed Date: Oct. 1, 2013, 8 pages.
"Response to First Office Action for JP Patent Application No. 2011-530082", Mailed Date: Oct. 1, 2013, 11 pages.
"Second Office Action for JP Patent Application No. 2011-530082", Mailed Date: Mar. 11, 2014, 8 pages.
"Response to Second Office Action for JP Patent Application No. 2011-530082", Filed: Jul. 10, 2014, 6 pages.
Notice of Allowance for JP Patent Application No. 2011-530082, Filed: Aug. 5, 2014, 5 pages.
"Non-final Office Action for U.S. Appl. No. 13/851,797", Mailed Date: Apr. 10, 2014, 22 pages.
"Notice of Allowance for U.S. Appl. No. 13/851,797", Mailed Date: Aug. 21, 2014, 10 pages.
Notice of Allowance for U.S. Appl. No. 13/851,797, Mailed Date: Mar. 24, 2015, 10 pages.
Notice of Allowance for U.S. Appl. No. 13/851,797, Mailed Date: Jul. 6, 2015, 10 pages.
Notice of Allowance for U.S. Appl. No. 13/851,797, Mailed Date: Nov. 5, 2015, 2015, 10 pages.
U.S. Appl. No. 13/851,797—Notice of Allowance Mailed Mar. 24, 2015, 10 pages.
"First Office Action for JP Patent Application No. 2014-142550", Mailed Date: Aug. 25, 2015, pages.
"Response to First Office Action for JP Patent Application No. 2014-142550", Mailed Date: Nov. 24, 2015, pages.
"First Office Action for JP Patent Application No. 2014-142551", Mailed Date: Aug. 18, 2015, pages.
"Response to First Office Action for JP Patent Application No. 2014-142551", Mailed Date: Nov. 16, 2015, pages.
U.S Appl. No. 12/819,230, Non Final Office Action mailed Dec. 24, 2012, 18 pages.
U.S. Appl. No. 12/819,230, Final Office Action mailed May 9, 2013, 20 pages.
U.S Appl. No. 12/819,230, Notice of Allowance mailed Jan. 8, 2014, 9 pages.

(56) References Cited

OTHER PUBLICATIONS

"International Search Report", Mailed Date: Oct. 24, 2011, Application No. PCT/US2011/024925, Filed Date: Feb. 15, 2010, 11 Pages.
CN 201180010523.9—First Office Action and Seach Report mailed Jun. 20, 2013, 14 pages.
CN 201180010523.9—Notice of Allowance mailed Jan. 21, 2014, pages.
EP 11747870.1—R. 61 Search Report mailed May 13, 2014, 3 pages.
EP 11747870.1—First Office Action mailed May 23, 2014, 7 pages.
JP 2012-555036—First Office Action mailed Dec. 4, 2014, 18 pages.
JP 2012-555036—Notice of Allowance mailed Dec. 21, 2015, 5 pages.
"Non-Final Office Action for U.S Appl. No. 13/084,786", Mailed Date: Mar. 12, 2013, 24 pages.
"Response to Non-Final Office Action for U.S. Appl. No. 13/084,786", Mailed Date: Mar. 12, 2013, Filed Date: Jun. 12, 2013, 13 pages.
"Final Office Action for U.S. Appl. No. 13/084,786", Mailed Date: Jul. 17, 2013, 27 pages.
"Request for Continued Examination and Response to Final Office Action for U.S. Appl. No. 13/084,786", Mailed Date: Jul. 17, 2013, Filed Date: Oct. 17, 2013, 16 pages.
U.S. Appl. No. 13/084,786, Non Final Office Action mailed Jul. 8, 2015, 29 pages.
U.S. Appl. No. 13/084,786, Final Office Action mailed Nov. 27, 2015, 22 pages.
U.S. Appl. No. 13/155,422—Non Final Office Action mailed Dec. 20, 2012, 10 pages.
U.S. Appl. No. 13/155,422—Final Non Final Office Action mailed Aug. 16, 2013, 22 pages.
U.S. Appl. No. 13/155,422—Non Final Office Action mailed Apr. 11, 2014, 9 pages.
U.S. Appl. No. 13/155,422—Notice of Allowance mailed Aug. 15, 2014, 8 pages.
U.S. Appl. No. 13/155,422—Non Final Office Action mailed Mar. 26, 2015, 19 pages.
U.S. Appl. No. 13/155,422—Notice of Allowance mailed Sep. 15, 2015, 11 pages.
U.S. Appl. No. 13/891,116, Non Final Office Action mailed Jan. 14, 2015, 13 pages.
U.S. Appl. No. 13/891,116, Non Final Office Action mailed Oct. 28, 2015, 7 pages.
U.S. Appl. No. 14/037,986, Non Final Office Action mailed Apr. 27, 2015, 21 pages.
U.S. Appl. No. 14/037,986, Final Office Action mailed Nov. 18, 2015, 24 pages.
U.S. Appl. No. 61/444,123, Benko, et al., "Providing an Interactive Experience Using a 3D Depth Camera and a 3D Projector", Filed Date: Feb. 7, 2011.
U.S. Appl. No. 61/307,422, Wilson, et al., "Projector and Depth Camera Systems for Deviceless Augmented Reality and Interaction ", Filed Date: Feb. 23, 2010.
U.S. Appl. No. 611749779, Wilson, et al., "Immersive Display with Peripheral Illusions", Filed Date: Jan. 7, 2013.
U.S. Appl. No. 611772280, Benko, et al., "Steerable Augmented Reality with the Beamatron ", Filed Date: Mar. 4, 2013.
Wu, et.al., "Gesture Registration, Relaxation and Reuse for Multi-Point Direct-Touch Surfaces", Proceedings of the First IEEE International Workshop on Horizontal Interactive Human-Computer Systems (TABLETOP'06), IEEE Computer Society, 8 pages.
Wellner, "Interacting with paper on the DigitalDesk," Communications of the ACM, vol. 36, No. 7, Jul. 1993, pp. 87-96.
Liao et.al., PapierCraft: A Command System for Interactive Paper, UIST '05, Oct. 23-27, 2005, Seattle, Washington, USA.
Brignull, et al., "The Introduction of a Shared Interactive Surface into a Communal Space," Proceedings of the 2004 ACM Conference on Computer Supported Cooperative Work, Mar. 1-2, 2004, 10 pages.
Zhang, et al., "Visual Panel: Virtual Mouse, Keyboard and 3D Controller with an Ordinary Piece of Paper," Proceedings of the 2001 Workshop on Perceptive User Interfaces, 2001, 8 pages.

Wilson, et al., "FlowMouse: A Computer Vision-Based Pointing and Gesture Input Device," accessible at <<http://research.microsoft.com/-cutrell/Interact2005 Flow Mouse.pdf>>, Interact, 2005, 14 pages.
Coutaz, et al., "Coupling Interaction Resources: an Analytical Model," Proceedings of the 2005 Joint Conference on Smart Objects and Ambient Intelligence: Innovative Context-Aware services: Usages and Technologies, 2005, pp. 183-188.
Patten, et al., "Sensetable: A Wireless Object Tracking Platform for Tangible User Interfaces," Proceedings of CHI 2001, ACM Press, 2001, 8 pages.
Matsushita, et al., "HoloWall: Designing a Finger; Hand, Body, and Object Sensitive Wall," UIST 97, Banff, Alberta, Canada, ACM Press, 1997, 2 pages.
"Optimus Maximus keyboard." Art Lebedev Studio, available at <<http://www.artlebedev.com/everything/optimus/>> accessed on Jan. 5, 2009, 5 pages.
Bell, et al., "Dynamic Space Management for User Interfaces," Proceedings of the UIST 2000: ACM Symposium on User Interface Software and Technology, 2000, pp. 239-248.
Cotting, et al., "Interactive Environment-Aware Display Bubbles", Proceedings of the 19th Annual ACM Symposium on User Interface Software and Technology, Oct. 15-18, 2006, pp. 245-254.
Forlines, et al., "Direct-touch vs. Mouse Input for Tabletop Displays," Proceedings of the SIGCHI Conference on Human Factors in Computing Systems, 2007, pp. 647-656.
Hinrichs, et al., "Examination of Text-Entry Methods for Tabletop Displays," Proceedings of the SIGCHI Conference on Human Factors in Computing Systems, 2007, pp. 647-556.
Moraveji, et al., "Mischief: Supporting Remote Teaching in Developing Regions," Proceeding of the Twenty-Sixth Annual SIGCHI Conference on Human factors in Computing Systems, 2008, pp. 353-362.
Parker, et al., "TractorBeam: Seamless Integration of Local and Remote Pointing for Tabletop Displays," Proceedings of Graphics Interface 2005, 2005, pp. 33-40.
Rekimoto, et al., "Augmented Surfaces: A Spatially Continuous Work Space for Hybrid Computing Environments," Proceedings of the SIGCHI conference on Human factors in Computing Systems: the CHI is the Limit, 1999m pp. 378-385.
Shen, et al., "DiamondSpin: an Extensible Toolkit for Around-the-Table Interaction," Proceedings of the SIGCHI Conference on Human Factors in Computing Systems, 2004, pp. 167-174.
"Microsoft Surface" homepage, available at <<http://www.surface.com>>, accessed on Jan. 7, 2009, 1 page.
Agarawala, et al., "Keepin' it Real: Pushing the Desktop Metaphor with Physics, Piles and the Pen," Proceedings of the SIGCHI Conference on Human Factors in Computing Systems, 2006, pp. 1283-1292.
Buchenau, et al., "Experience Prototyping," Proceedings of the 3rd Conference on Designing Interactive Systems: Processes, Practices, Methods, and Techniques, 2000 424-433.
Bill Buxton home page, referencing publication "Sketching User Experiences," availabe at <<http://www.billbuxton.com/ >> accessed on Jan. 7, 2009, 6 pages.
Cook, et al., "Designers' Use of Paper and the Implications for Informal Tools," Proceedings of the 17th Australia conference on Computer-Human Interaction: Citizens Online: Considerations for Today and the Future, 2005, pp. 1-10.
Dietz, et al., "DiamondTouch: a Multi-User Touch Technololgy," Mitsubishi Electric Research Laboratories, Report TR2003-125, Oct. 2003, 10 pages.
Guimbretiere, et al., "Fluid Interaction with High-Resolution Wall-Size Displays," Proceedings of the 14th Annual ACM Symposium on User interface Software and Technology, 2001, 10 pages.
Hailpern, et al., "Team Storm: Demonstrating an Interaction Model for Working with Multiple Ideas During Creative Group Work," Proceedings of the 6th ACM SIGCHI Conference on Creativity & Cognition, 2007, pp. 193-202.
Haller, et al., "Shared Design Space," ACM SIGGRAPH 2006 Emerging Technologies, International Conference on Computer Graphics and Interactive Techniques, Article 29, 12 pages.

(56) References Cited

OTHER PUBLICATIONS

Holman, et al., "Paper Windows: Interaction Techniques for Digital Paper," Proceedings of the SIGCHI Conference on Human Factors in Computing Systems, 2005, pp. 591-599.

Kim, et al., "Video-Based Document Tracking: Unifying Your Physical and Electronic Desktops," Proceedings of the 17th Annual ACM Symposium on User Interface Software and Technology, 2004, pp. 99-107.

Klemmer, et al., "The Designers' Outpost: a Task-Centered Tangible Interface for Web Site Information Design," available at <<http://www.si.umich.edu/mwnewman/pubs/uist2001 >>, 2001, 10 pages.

Klemmer, "Integrating Physical and Digital Interactions," <<http://www.computer.org/portal/site/computer/menuitem.e533b16739f52e4b0eflbd108bcd4>>, Computer, Oct. 2005, 4 pages.

Klemmer, et al., "How Bodies Matter: Five Themes for Interaction Design," Proceedings of the Designing Interactive Systems, 2006, pp. 140-149.

Koshimizu, et al., "SnapTable: Physical Handling for Digital Documents with Electronic Paper," Proceedings of the third Nordic conference on Human-computer interaction, 2004, pp. 401-404.

Lange, et al., "Insight lab: an Immersive Team Environment Linking Paper, Displays, and Data," Proceedings of the 1998 Conference on Human Factors in Computing Systems, 1998, pp. 550-557.

Leithinger, et al., "Improving Menu Interaction for Cluttered Tabletop Setups with User-Drawn Path Menus," Second Annual IEEE International Workshop on Horizontal Interactive Human-Computer System, 2007, pp. 121-128.

Lin, et al. "Denim: Finding a Tighter Fit Between Tools and Practice for Web Site Design," Proceedings of the SIGCHI Conference on Human Factors in Computing Systems, 2000, 8 pages.

Moggridge, Bill, Designing Interactions, book published by MIT Press, 2007, table of contents, available at <<http://www.designinginteractions.com/chapters>>, accessed on Jan. 8, 2009, 1 page.

Newman, et al., "Sitemaps, Storyboards, and Specifications: a Sketch of Web Site Design Practice," Proceedings of the 3rd Conference on Designing Interactive Systems: Processes, Practices, Methods, and Techniques 2000, pp. 263-274.

Olsen, et al. "Spilling: Expanding Hand Held Interaction to Touch Table Displays," Second Annual IEEE International Workshop on Horizontal Interactive Human-Computer System, 2007, pp. 163-170.

Rekimoto, et al., "DataTiles: a Modular Platform for Mixed Physical and Graphical Interactions," Proceedings of the SIGCHI Conference on Human Factors in Computing Systems, 2001, 269-276.

Sokoler, et al., "Physically Embodied Video Snippets Supporting Collaborative Exploration of Video Material During Design Sessions," Proceedings of the Second Nordic Conference on Human-Computer Interaction, 2002, pp. 139-148.

Subrahmanian, et al., "Boundary Objects and Prototypes at the Interfaces of Engineering Design," Computer Supported Cooperative Work, vol. 12, Issue 2, 2003, pp. 185-203, ACM abstract provided only, 2 pages.

Tang, et al., "A Framework for Understanding the Workspace Activity of Design Teams," Proceedings of the 1988 ACM Conference on Computer-Supported Cooperative Work, 1988, pp. 244-249.

Underkoffler, et al., "Urp: a Luminous-Tangible Workbench for Urban Planning and Design," Proceedings of the CHI '99, May 15-20 1999, 8 pages.

Gargallo, et al., "Bayesian 3D Modeling from Images using Multiple Depth Maps", CVPR, Proceedings of the 2005 IEEE Computer Society Conference on Computer Vision and Pattern Recognition (CVPR'05), vol. 02, Jun. 20-26, 2005.

Nguyen, et al., "Depth image-based rendering from multiple cameras with 3D propagation algorithm", International Conference on Immersive Telecommunications, Proceedings of the 2nd International Conference on Immersive Telecommunications, May 27-29, 2009.

Ohta, et al., "Share-Z: ClienUServer Depth Sensing for See-Through Head Mounted Displays", Retrieved at <<http://image-www.esys.tsukuba.ac.jp/research/publications/ohta__ISMR__2001 Mar.pdf>>, Presence: Teleoperators and Virtual Environments, vol. 11, No. 2, Apr. 2002.

Gingichashvili, Sarah, "PlayAnywhere—Microsoft's Interactive Playground", Retrieved at <<http://thefutureofthings.com/news/1037/playanywhere-microsofts-interactive-playground.html >>, Nov. 2, 2007. 2 pages.

Fuchs, et al., "Augmented Reality Visualization for Laparoscopic Surgery", Proceedings of the First International Conference on Medical Image Computing and Computer-Assisted Intervention, Oct. 11-13, 1998.

Zhou, et al., "Multi-Projector Display with Continuous Self-Calibration", International Conference on Computer Graphics and Interactive Techniques, Proceedings of the 5th ACM/IEEE International Workshop on Projector camera systems, Aug. 10, 2008.

\* cited by examiner

ONE ILLUSTRATIVE MANNER OF APPLYING A SIMULATED EFFECT TO A VIRTUAL OBJECT

PROVIDING AN INTERACTIVE EXPERIENCE USING A 3D DEPTH CAMERA AND A 3D PROJECTOR

This application claims the benefit of U.S. Provisional Application No. 61/444,123 (the '123 Application), filed Feb. 17, 2011. The '123 Application is incorporated by reference herein in its entirety.

BACKGROUND

The research community has explored a variety of alternative techniques for creating and interacting with objects, such as interactive tabletop displays and wall displays. However, known techniques do not provide, to a desired extent, an interface that is richly expressive, realistic and immersive, while simultaneously easy to learn and use.

SUMMARY

An interaction system is described herein that allows a user to create and interact with 3D virtual objects. In one implementation, the interaction system operates by a capturing a depth image of a physical object placed on, or in proximity to, a surface. For example, the physical object may comprise an inanimate object, a body part, or combination thereof. The interaction system simultaneously captures a video image of the physical object. The interaction system then generates a 3D virtual object based on the depth image and the video image. The 3D virtual object is a virtual counterpart of the physical object. The interaction system then uses a 3D projector (such as a projector for generating stereoscopic images) to project the 3D virtual object on, or in proximity to, the surface.

According to another illustrative feature, the interaction system can provide a real-time and dynamic presentation of a virtual scene, including, for instance, the 3D virtual object. At any time, a user can instruct the interaction system to capture an instance of a physical object, comprising, for instance, an inanimate object, a body part, or combination thereof. This provides a captured 3D virtual object. According to another illustrative feature, the user can then instruct the interaction system to manipulate any part(s) of the virtual scene in any manner, such as by manipulating a captured 3D virtual object by shifting it in any direction, scaling it, and/or rotating it, etc.

According to another illustrative feature, the interaction system can generate the 3D virtual object by identifying a geometrical shape based on points associated with the depth image. The interaction system then applies a texture, obtained from the video image, to the geometrical shape. This adds an appearance to the geometrical shape.

According to one another illustrative feature, the interaction system can apply the texture using a projective texturing technique. This approach may take into consideration at least: a direction of attention of the user; a position of the 3D projector; and the geometry of a scene on which the 3D virtual object is to be projected (as represented in the depth image). By virtue of this technique, the interaction system can provide a natural-looking 3D virtual object (from the perspective of the user), even on an irregular real surface, such as the user's cupped hand.

According to another illustrative feature, the interaction system can present the 3D virtual object on, or in proximity to, the surface in a mirrored relationship to its counterpart physical object. This allows the user to gain an understanding of the correlation between the physical object and its virtual counterpart, without interfering with the physical object.

According to another illustrative feature, a user can apply the interaction system to successively construct a composite model based on 3D virtual object building blocks, ultimately derived from one or more physical objects.

According to another illustrative feature, local and remote users can use respective interaction systems to generate and share 3D virtual objects. In one implementation, physical objects that are present at a local location appear as virtual objects at a remote location, and vice versa.

According to another illustrative feature, the interaction system can incorporate a physics simulator. Upon the occurrence of a triggering event, the physics simulator generates and applies a simulation effect to a 3D virtual object. The triggering event corresponds to a telltale action that the user performs with respect to the 3D virtual object. The simulation effect defines the behavior of the 3D virtual object in response to the triggering action.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative interaction system for allowing a user to generate and interact with 3D virtual objects. Section B describes illustrative methods which explain the operation of the interaction system of Section A. Section C describes illustrative processing functionality that can be used to implement any aspect of the features described in Sections A and B.

Figure 23:
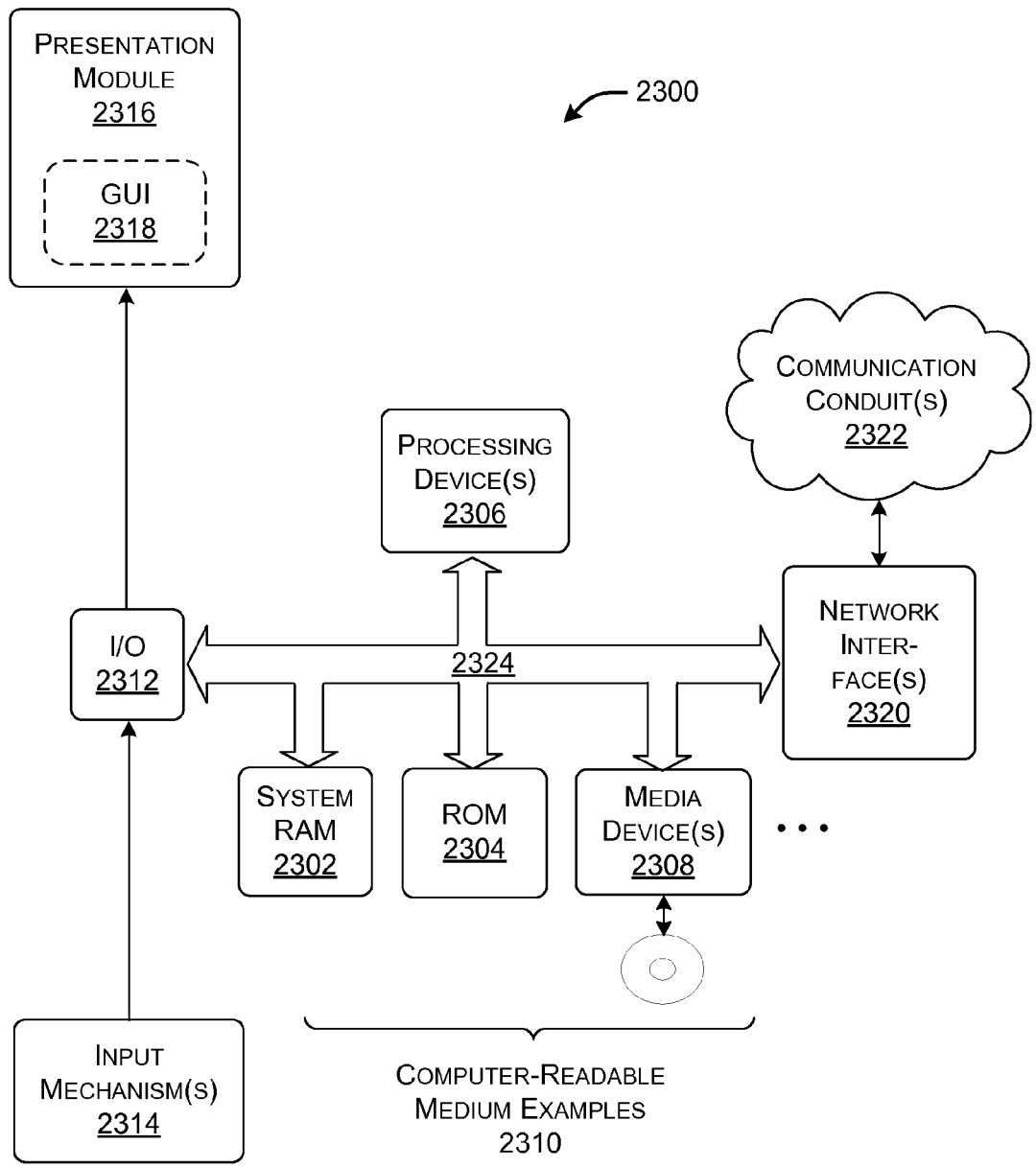
FIG. 23 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 23, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Interaction System

Figure 1:
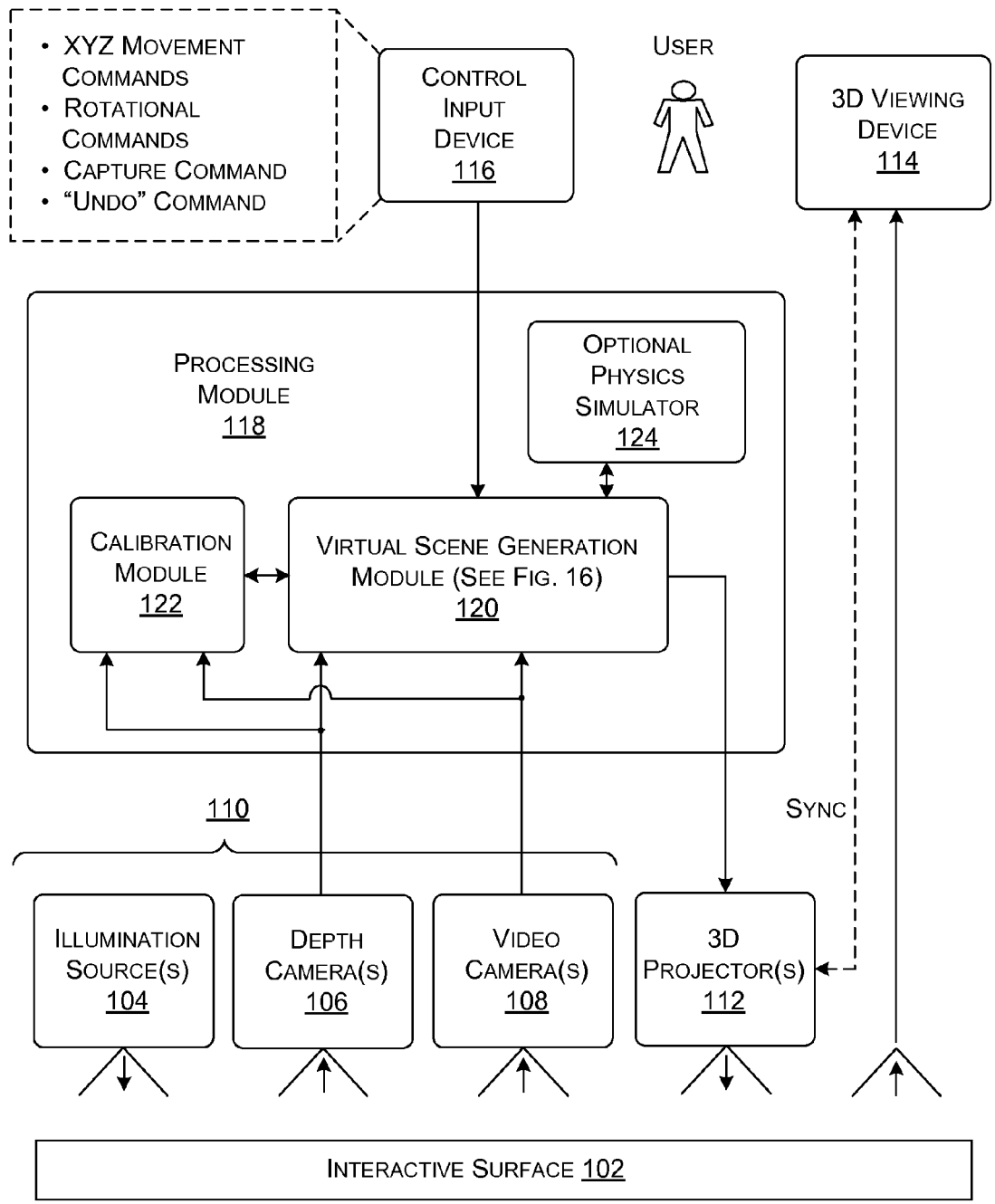
FIG. 1 shows a depiction of an illustrative interaction system which presents 3D virtual objects on an interactive surface in response to counterpart physical objects placed on the interactive surface.

FIG. 1 shows an illustrative interaction system 100 for projecting 3D virtual objects onto an interactive surface 102. The interaction system 100 generates the 3D virtual objects based on one or more physical objects, which are also placed on the interactive surface 102, including any inanimate object and/or any body part. This section presents an explanation of illustrative components that can accomplish the above-stated operations.

In one case, the interactive surface 102 includes a tabletop of any size and shape. In other cases, the interactive surface 102 comprises a floor surface, a wall surface, etc. In one case, the interactive surface 102 has a flat surface. But in other cases, the interactive surface 102 can have a non-planar surface, such as a spherical surface. In addition, as will be set forth in detail below, the interaction system 100 can project 3D objects on irregular-shaped objects which are presented on top of any surface.

A user can place physical objects on the interactive surface 102. Further, the interaction system 100 can project 3D virtual objects on the interactive surface 102. The term "on" is to be understood liberally in this description as encompassing the case in which the user merely places a physical object in proximity to the interactive surface 102, and in which the interaction system 100 places a 3D virtual object in proximity to the interactive surface 102.

More generally stated, the interactive surface 102 (or simply "surface") refers to any surface on which (or around which) a user may place physical objects and/or perform other work. The interactive surface 102 also refers to any surface on which (or around which) the interaction system 100 projects 3D virtual objects and/or other information. The interactive surface 102 can comprise multiple component surfaces that may vary from environment to environment; and different user scenarios and applications may cause the interaction system 100 to display content on different component surfaces. To cite one example (described below in greater detail), the interaction system 100 may project a 3D virtual object onto the hand of a user. While the user may perceive the 3D virtual object as resting as a single entity in his or her hand, to create this illusion, the interaction system 100 may actually project image parts on the user's hand, a tabletop below the hand, and even on other parts of the room, such as the floor or a wall. In this scenario, all of these surface components comprise part of the interactive surface 102. Nevertheless, for ease of reference, the following description will most often assume that the interactive surface 102 comprises a defined workspace that extends from a tabletop.

The interaction system 100 includes a collection of devices which interact with the interactive surface 102. For example, the interaction system 100 includes an illumination source 104 that projects radiation of any wavelength (such as infrared radiation or near-infrared radiation) onto the surface of the interactive surface 102. For example, the illumination source 104 can project a regular or random array of spots or other patterns onto the interactive surface 102. Although only one illumination source 104 is shown in FIG. 1, the interaction system 100 can include two or more such sources.

A depth camera 106 receives radiation (emitted by the illumination source 104) that reflects from the interactive surface 102 or otherwise illuminates the interactive surface 102. The depth camera 106 processes the received radiation to provide a depth image. The depth image reflects the distances of different parts of the interactive surface 102 (and objects placed thereon) from the depth camera 106. These distances, in turn, can later be used to infer the shape of the physical objects placed on the interactive surface 102. The depth camera 106 can use any technique to generate the depth image, such as the well known time-of-flight technique, a structured light technique, and so on. In a structured light technique, the illumination source 104 projects an array of spots or other shapes onto a surface; the way in which these shapes impinge the surface reveals depth information about the surface (and objects placed thereon). Although only one depth camera 106 is shown in FIG. 1, the interaction system 100 can include two or more such cameras. Using additional depth cameras allows the interaction system 100 to generate a more complete representation of the geometry of physical objects placed on the interactive surface 102. With a single illumination source 104 and associated single depth camera 106, the interaction system 100 can form a presentation of only the parts of the physical objects that are facing the single depth camera 106.

A video camera 108 captures a video image of the interactive surface 102 (and objects placed thereon). For example, the video camera 108 can form a red-green-blue (RGB) representation of the objects placed on the interactive surface 102. Although only one video camera 108 is shown in FIG. 1, the interaction system 100 can include two or more such cameras.

In one case, the interaction system 100 can provide distinct and separate components to implement the illumination source 104, the depth camera 106, and the video camera 108. In another case, an integral imaging unit 110 can be used to provide all three of these components. In one example, the interaction system 100 can use the Kinect™ controller to implement the integral imaging unit 110. The Kinect™ controller is produced by Microsoft Corporation of Redmond, Wash.

A 3D projector (referred to as just a "projector" below) 112 projects 3D virtual objects onto the interactive surface 102. The projector 112 can be implemented using any suitable technology, such as, but not limited to, the Dell 1610HD projector provided by Dell Inc. of Round Rock, Tex. In one implementation, the projector 112 is configured to project a stereoscopic representation of the 3D virtual objects. This involves generating and projecting left images for the left eye and right images for the right eye, e.g., in a rapid interleaved fashion defined by a frame rate. The left images are slightly offset with respect to the right images. Although only one projector 112 is shown in FIG. 1, the interaction system 100 can include two or more such projectors. In another case, the 3D projector 112 can comprise a projector which projects a holographic representation of the 3D virtual objects, e.g., onto a holographic screen. But to facilitate explanation, in the remaining description, it will be assumed that the 3D projector 112 provides a stereoscopic representation of the 3D virtual objects.

As will be set forth in greater detail below, the projector 112 can present a 3D virtual object on the interactive surface 102 in a mirrored relationship to its corresponding physical object, which also may remain on the interactive surface 102. This placement of the 3D virtual object is beneficial for the reasons set forth below.

A 3D viewing device 114 allows a user to view the stereoscopic images that are projected onto the interactive surface 102 by the projector 112. For example, in one implementation, the 3D viewing device 114 can be implemented as stereoscopic shutter glasses, polarized glasses, anaglyph (e.g., red-blue) glasses, and so on. In some case, the 3D viewing device 114 can be synchronized with the frame rate of the projector 112 (as indicated by the dashed line in FIG. 1 which connects the 3D viewing device 114 and the projector 112), e.g., using Digital Light Processing (DLP) link technology, etc.

A control input device 116 allows a user to instruct the interaction system 100 to perform various actions with respect to 3D virtual objects. For example, assume that the interactive surface 102 shows a single physical object and a corresponding 3D virtual object. In a dynamic mode of operation, the interaction system 100 provides a real-time and dynamic presentation of the 3D virtual object on the interactive surface 102. This means that, when the user moves the physical object, its mirrored 3D virtual object will change in a corresponding manner. Assume now that the user wants to form a static snapshot of the physical object at a particular point in time, producing a captured 3D virtual object. To do so, the user can actuate a capture command using the control input device 116. The interaction system 100 may continue to project the real-time and dynamic representation of the 3D virtual object, along with the static captured 3D virtual object. The control input device 116 can also include an "undo" command which allows a user to effectively remove (e.g., delete) any 3D virtual object(s) captured in an immediately prior capture operation.

In one case, the interaction system 100 can instruct the projector 112 to momentarily stop projecting images when the user actuates a capture command. This allows the interaction system 100 to capture the snapshot of the physical object without interference from the images projected by the projector 112.

The control input device 116 also allows a user to input various commands to move any captured 3D virtual object. For example, the user can interact with the control input device 116 to shift a 3D virtual object in any of the X, Y, and Z axes, and/or to rotate the 3D virtual object around any specified axis. In addition, the user can interact with the control input device 116 to change the size (scale) of a 3D virtual object or any other attribute of the 3D virtual object (such as its color, level of transparency, etc.).

The commands identified above are representative, not exhaustive. The control input device 116 can provide instructions for manipulating a 3D virtual object in any other way. For example, the user can use the control input device 116 to instruct the interaction system 100 to crop a captured 3D scene to isolate a component object within it, copy a captured 3D virtual object, etc. The user can also store any 3D virtual objects (including composite 3D virtual objects) in a long-term archive. This allows the user to retrieve these objects for projection in a later interactive session.

In one case, the control input device 116 can be implemented as a key input device. In this case, the control input device 116 can map different commands to different respective keys. Alternatively, or in addition, the control input device 116 can be implemented as any graphical user interface presentation. For example, the graphical user interface presentation can present a skeleton depiction of a 3D virtual object. The user can use a mouse device to drag the skeleton depiction of the 3D virtual object, e.g., by shifting and rotating it, causing corresponding movement of the 3D virtual object which is projected onto the interactive surface 102. Alternatively, or in addition, the control input device 116 can be implemented by functionality which senses touch contacts or gestures on or about the interactive surface 102. For example, the functionality can detect contacts made with one or more fingers on the interactive surface 102, expressive gestures with a hand, etc. The functionality can map these sensed contacts and gestures to various commands which control the 3D virtual object and/or other parts of the interactive system 100 (such as any of the cameras used by the interaction system 100).

A processing module 118 interfaces with all of the peripheral devices mentioned above and performs various types of processing. The processing module 118 can be implemented by one or more computer devices and associated data stores, provided in a single location or distributed over plural locations.

The main processing engine of the processing module 118 is the scene generation module 120 (identified below as simply a "generation module" for ease of reference). At each instance, the generation module 120 receives a depth image from the depth camera 106 and a video image from the video camera 108. Based on this information, the generation module 120 generates the 3D virtual objects. Section B provides additional information regarding the manner in which the generation module 120 performs this function. The generation module 120 then instructs the projector 112 to project the 3D virtual objects. The generation module 120 also receives and responds to instructions from the control input device 116, e.g., by capturing 3D virtual objects, releasing previously captured 3D virtual objects, moving the 3D virtual objects, and so on.

A calibration module 122 performs various set-up tasks that configure the interaction system 100. For example, a user can interact with the calibration module 122 to calibrate the depth camera 106 and video camera 108 to a common frame of reference. The frame of reference may correspond to a real-world coordinate system associated with the interactive surface 102. Accordingly, for instance, once calibrated, distances conveyed by the depth images correspond to actual distances in the real world. The calibration module 122 can then calibrate the projector 112 to the same common frame of reference. Section B provides additional information regarding the operation of the calibration module 122.

Finally, the interaction system 100 can include an optional physics simulator 124. The physics simulator 124 stores patterns that describe the characteristics of various telltale actions (i.e., gestures) that a user may perform with respect to a 3D virtual object (such as a ripping action, striking action, squeezing action, grasping and moving action, etc.). The physics simulator 124 also maps these actions to respective simulation effects. In operation, the physics simulator 124 can analyze the movement that the user is performing with respect to a 3D virtual object at any given time. If it determines that the user is performing one of the telltale actions, it can interact with the generation module 120 to apply a corresponding simulation effect to the 3D virtual object. The simulation effect defines the behavior of the 3D virtual object in response to the user's triggering action. The user then observes the simulation effect in the resultant modified 3D virtual object that is projected onto the interactive surface 102.

In some cases, the physics simulator 124 may apply simulation effects that are modeled based on the laws of physics. These effects cause the 3D virtual objects to behave in the same manner as physical objects. In addition, or alternatively, the physics simulator 124 can apply simulation effects that adopt nonrealistic dynamics, providing, for example, exaggerated or fanciful effects that may be appropriate for game environments.

The physics simulator 124 can rely, at least in part, on known simulation algorithms to manipulate 3D virtual objects in realistic or nonrealistic ways, including models that take into account rigid body dynamics, soft body dynamics, etc. Background information regarding physics simulation can be found, for example, in: PALMER, Grant, *Physics for Game Programmers,* 1st Addition, Apress, Publishers, 2005; EBERLY, David H., *Game Physics*, Morgan Kaufmann Publishers, 2010; VAN DEN BERGEN, Gino, *Game Physics Pearls*, A. K. Peters Ltd. Publishers, 2010; ERICSON, Christer, *Real-Time Collision Detection*, Morgan Kaufmann Publishers, 2005; WILSON, et al., "Bringing Physics to the Surface," *Proceedings of the 21st Annual ACM Symposium on User Interface Software and Technology,* 2008, pp. 67-76; WILSON, Andrew A., "Simulating Grasping Behavior on an Imaging Interactive Surface," *Proceedings of the ACM International Conference on Interactive Tabletops and Surfaces,* 2009, pp. 125-132; HILLIGES, et al., "Interactions in the Air: Adding Further Depth to Interactive Tabletops," *Proceedings of the 22nd Annual ACM Symposium on User interface Software and Technology,* 2009, pp. 139-148, and so on. Known physics simulators include PhysX, provided by Nvidia Corporation of Santa Clara, Calif.; Havok Physics, provided by Havok of Dublin Ireland; Newton Game Dynamics, produced by Julio Jerez and Alain Suero, and so on.

For example, the physics simulator 124 can determine that the user has used his or her finger to poke a 3D virtual object with a certain perceived force (e.g., based on the speed at which the user applies his or her finger to the 3D virtual object). Based on principles of Newtonian mechanics, the physics simulator 124 can apply a movement to the 3D virtual object which is proportional to the force. If the user applies the force to a corner of the 3D virtual object, the physics simulator 124 can apply a spinning motion to the 3D virtual object. A modeled amount of friction will eventually bring the 3D virtual object to rest. If the 3D virtual object is a soft body rather than a rigid body, the physics simulator 124 can apply a deformation to the 3D virtual object which is proportional to the amount of force applied thereto. If the user applies a pinching gesture to the 3D virtual object with a thumb and finger, the physics simulator 124 will assume that the user intends to grasp the 3D virtual object, and so on. Section B provides additional information regarding the operation of the physics simulator 124.

Although not shown, instead of, or in addition to, the use of the projector 112, the interaction system 100 can present 3D virtual objects in graphical form on a display device, such as a computer monitor. That display device can be located on top of or in proximity to the interactive surface 102 to simulate the effect of the projection of 3D virtual objects on the interactive surface 102 itself. The user can view stereoscopic content on the display device using the 3D viewing device 114, e.g., using shutter glasses or the like. Or the display device may comprise a holographic screen or the like.

Figure 2:
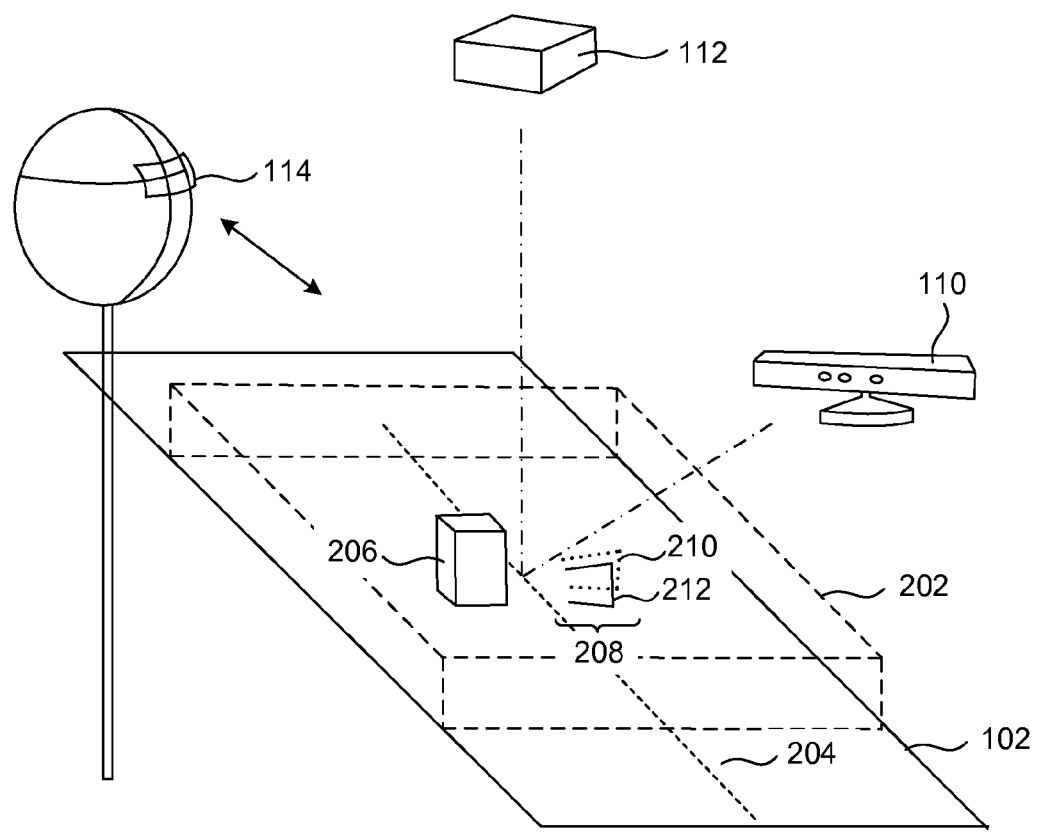
FIG. 2 is a depiction of one implementation of the interaction system of FIG. 1.

Advancing to FIG. 2, this figure shows one particular implementation of the interaction system of FIG. 1. In this case, the interactive surface 102 includes a tabletop surface. The surface here is shown as being flat, but, as stated above, it can have any contour. FIG. 2 also shows a workspace 202 which generally extends some distance above the interactive surface 102. The workspace 202 defines a region in which the user may place physical objects onto (or in the vicinity of) the interactive surface 102, and on which the projector 112 can present counterpart 3D virtual objects. However, as stated above, for some applications and scenarios, the workspace 202 can be extended to encompass other surface parts within a room or other environment.

More specifically, in the example of FIG. 2, a dividing line 204 demarcates a first portion of the interactive surface 102 from a second portion. The first portion is a region generally devoted to receiving physical objects placed there by the user, such as the illustrative physical cube 206. The second portion is a region generally devoted to receiving 3D virtual objects, such as the illustrative 3D virtual object 208, projected there by the projector 112. The illustrative 3D virtual object 208 is a virtual counterpart of the physical cube 206. Note that the 3D virtual object 208 has two component images (210, 212), corresponding to left and right images for the left and right eye, respectively.

In one implementation, the interaction system 100 projects the 3D virtual objects so that they mirror the placement of their counterpart physical objects. For example, the 3D virtual object 208 is placed adjacent to the physical cube 206 on the interactive surface 102, with the dividing line 204 in between. This placement approach is advantageous because it prevents the 3D virtual objects from interfering with the user's interaction with the physical objects. Further, this approach readily conveys the correspondence between the physical objects and their virtual counterparts.

However, the interaction system 100 can accommodate other placement strategies. In another approach, the interaction system 100 can permit the user to place physical objects above the dividing line 204, in the region in which the interaction system 100 places 3D virtual objects. In addition, or alternatively, the interaction system 100 can present 3D virtual objects below the dividing line 204, in the region where the user generally performs his or her work.

In the implementation of FIG. 2, the interaction system 100 places the projector 112 directly above the interactive surface 102. Further, the interaction system 100 places the integral imaging unit 110 at about a 45 degree angle in relation to the interactive surface 102. The integral imaging unit 110 can be implemented, as noted above, by the Kinect™ controller, and includes the illumination source 104, depth camera 106, and video camera 108. If the interaction system 100 incorporates two or more integral imaging units (not shown), the processing module 118 can perform appropriate processing to synthesize the images produced by these units, to produce integrated images. These integrated images can potentially capture all visible sides of the physical objects placed on the interactive surface 102.

The user sits on one side of the interactive surface 102, looking down onto the interactive surface 102 from an angle. The user wears the 3D viewing device 114, such as shutter glasses, to view the stereoscopic content projected onto the interactive surface 102 by the projector 112.

Figure 3:
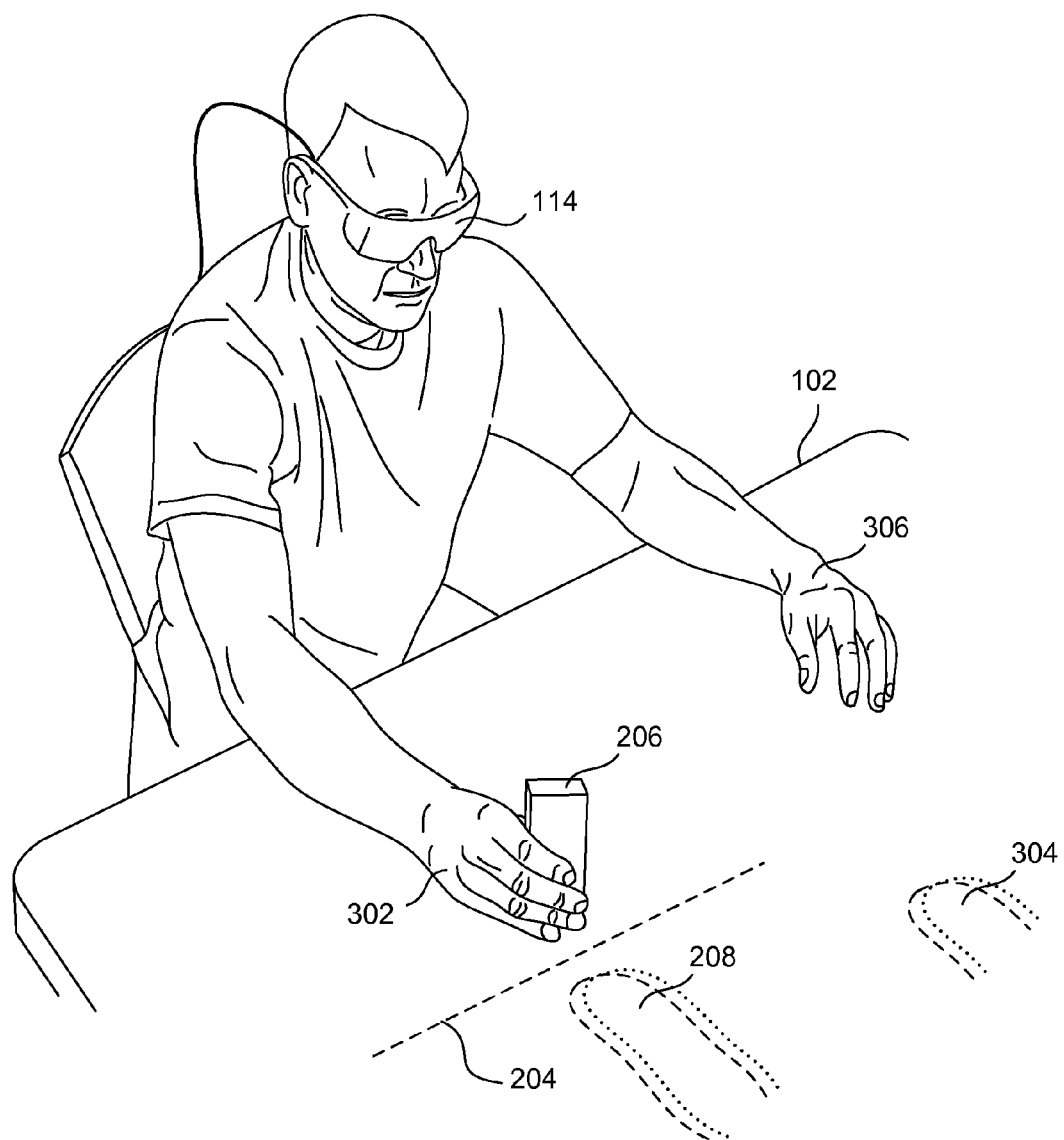
FIG. 3 shows one manner of use of the interaction system of FIG. 1.

FIG. 3 shows a yet more realistic depiction of one manner of use of the interaction system 100 shown in FIG. 2. As mentioned, the user sits on one side of the interactive surface 102, wearing the 3D viewing device 114. The user is in the process of using his left hand 302 to place the physical cube 206 at a desired location and orientation below the dividing line 204. The interaction system 100 displays the 3D virtual object 208 in mirrored relation to the physical cube 206, on the opposite side of the dividing line 204. At this instance, part of the 3D virtual object 208 corresponds to the user's left hand 302, because the user has not yet released the physical cube 206. At this juncture, the interaction system 100 may present another 3D virtual object 304 that corresponds to the user's right hand 306.

FIG. 3 depicts the 3D virtual objects (208, 304) from a vantage point that differs from the user's own perspective. From this non-user perspective, it may be difficult to make intelligible sense of the 3D virtual objects (208, 304). In contrast, from the user's own perspective, the 3D virtual objects appear as faithful copies of the physical objects placed on the interactive surface 102.

Although not shown, the interaction system 100 can also project other types of virtual objects onto the interactive service 102, such as computer-generated models of any type. That is, these virtual objects may not originate from physical objects placed by the user on the interactive surface 102, at least not in a current interactive session.

Figure 4:
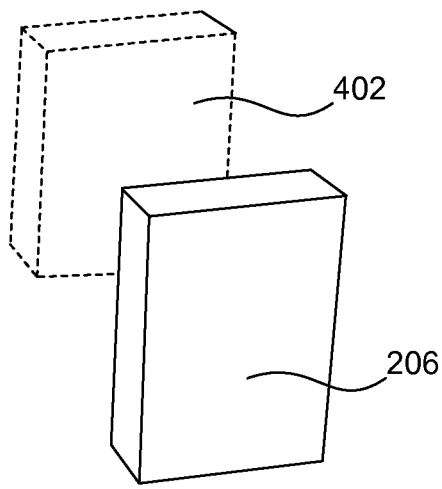
FIGS. 4-7 show 3D virtual objects that have been created using the interaction system of FIG. 1 in various ways (where physical objects are depicted using solid lines and 3D virtual objects are depicted using dashed lines).

At some point the user may decide to release his right hand 302 from the physical cube 206 and remove all body parts (and other extraneous objects) from the field of capture of the cameras (106, 108). The user may then activate a capture command on the control input device 116. This causes the interaction system 100 to capture a 3D virtual object counterpart of the physical cube 206, without the presence of the user's right hand 302 and other unwanted objects. More specifically, FIG. 4 shows a depiction of the physical cube 206 and its counterpart 3D virtual object 402 from the perspective of the user.

Figure 5:
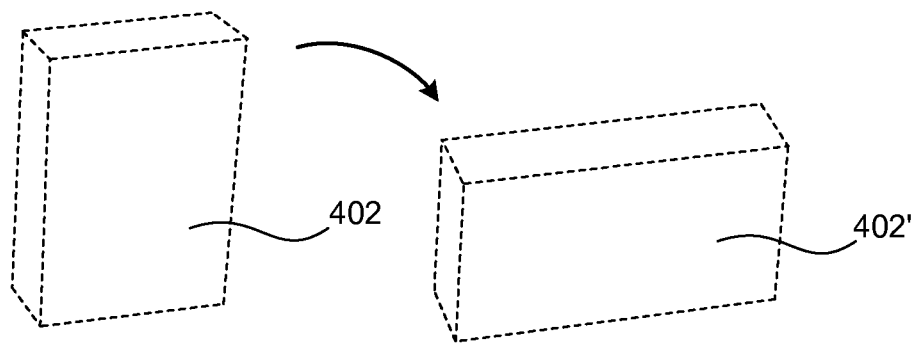
Figure 6:
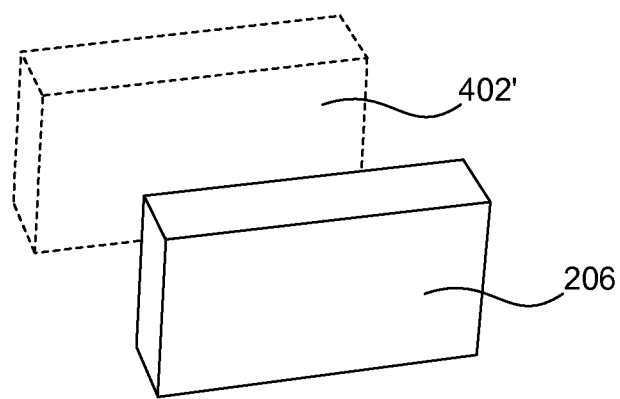

After the capture, the user may interact with the control input device 116 to manipulate the 3D virtual object 402 in any manner. Assume that the user enters a command to rotate the 3D virtual object 402 by 90 degrees. This produces the 3D virtual object 402' shown in FIG. 5. Another way that the user can achieve the same effect is by rotating the physical cube 206 by 90 degrees, and then actuating the capture command again. This again produces the 3D virtual object 402' shown in FIG. 6.

Figure 7:
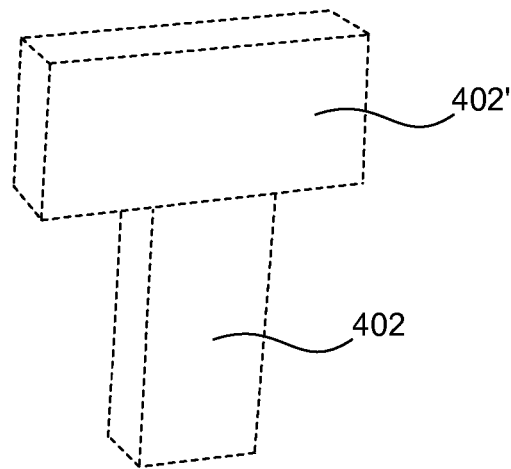

The user can also use the control input device 116 to compose a composite model that is an aggregate of component 3D virtual objects, essentially treating the component 3D virtual objects as building blocks. For example, assume that the user intends to place the horizontal 3D virtual object 402' that was created in FIG. 5 or FIG. 6 on top of the vertical 3D virtual object 402 that was created in FIG. 4. To do so, the user can use the control input device 116 to lift the horizontal 3D virtual object 402' and set it on top of the vertical 3D virtual object 402. This effect is shown in FIG. 7. This type of successive capture and manipulation can be used to create a composite model of any complexity. The interactive experience described above is user-friendly insofar as it is easy for the user to understand and use. This is because the interaction system 100 provides a convenient means for the user to introduce new "building blocks" into the virtual realm. Further, once created, the interaction system 100 provides a readily understandable and direct technique for manipulating these building block primitives, to compose a composite model of any complexity.

In the above examples, the user applies the control input device 116 to manipulate the 3D virtual objects. In addition, or alternatively, the user can use his or her hand(s) (and/or any kind of tool) to directly manipulate the 3D virtual objects as if they were real physical objects. For example, a user may physically "grasp" a 3D virtual object and place it on another 3D virtual object. Additional information regarding this mode of operation is set forth in Section B.

Figure 8:
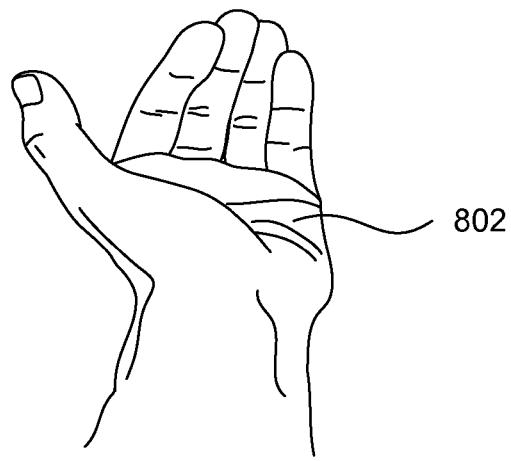
FIGS. 8 and 9 demonstrate a manner in which the interaction system of FIG. 1 can be used to project 3D virtual objects on irregular real surfaces, such as a user's cupped hand.
Figure 9:
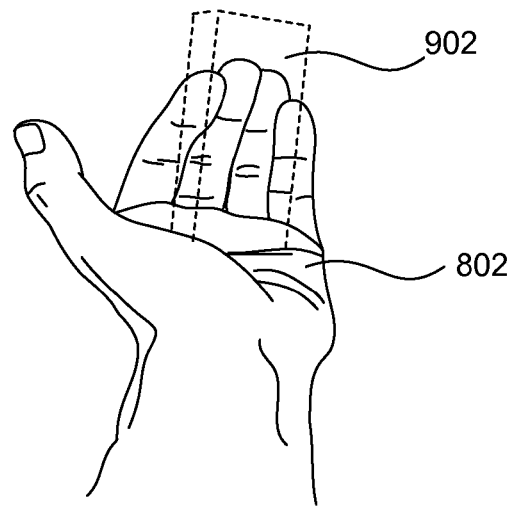
Figure 10:
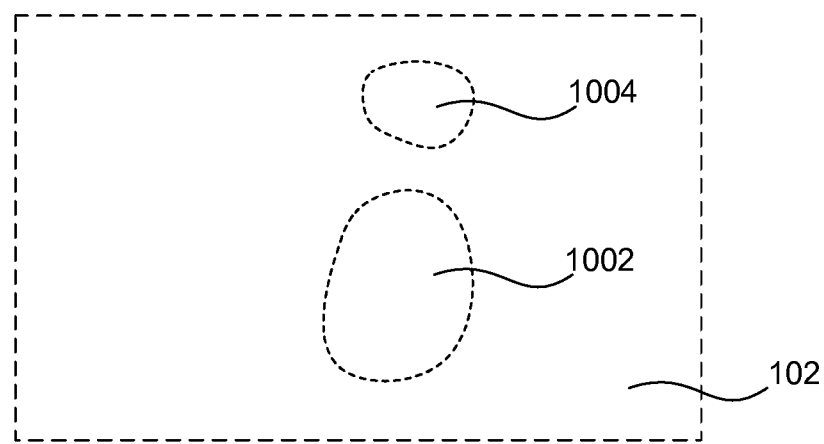
FIG. 10 is a depiction of a perspective-adjusted image that can be projected onto the interactive surface to achieve the 3D virtual object of FIG. 9 (which, in FIG. 9, is viewed from the standpoint of the user).

In all of the examples above, the interaction system 100 has displayed 3D virtual objects on a flat interactive surface 102, or on top of other 3D virtual objects (as in FIG. 7). In addition, the interaction system 100 can display 3D virtual objects on irregular surfaces. For example, consider the scenario shown in FIGS. 8 and 9. The user here instructs the interaction system 100 to display a 3D virtual object 902 in his or her cupped hand 802. The interaction system 100 achieves this effect through the technique of projective texturing, as will be set forth in Section B. As a result of this technique, the user will perceive the 3D virtual object 902 as if it was actually sitting in his or her open hand. But to produce this optical illusion, the interaction system 100 may actually produce and project an image that has little discernable resemblance to the physical object (when considered from any perspective other than the user's perspective). For example, the image may have disjoint parts. For example, as shown in FIG. 10, the interaction system 100 may display a bottom portion 1002 of the 3D virtual object 902 onto the user's hand and a top portion 1004 of the 3D virtual object 902 on any other surface(s).

Figure 11:
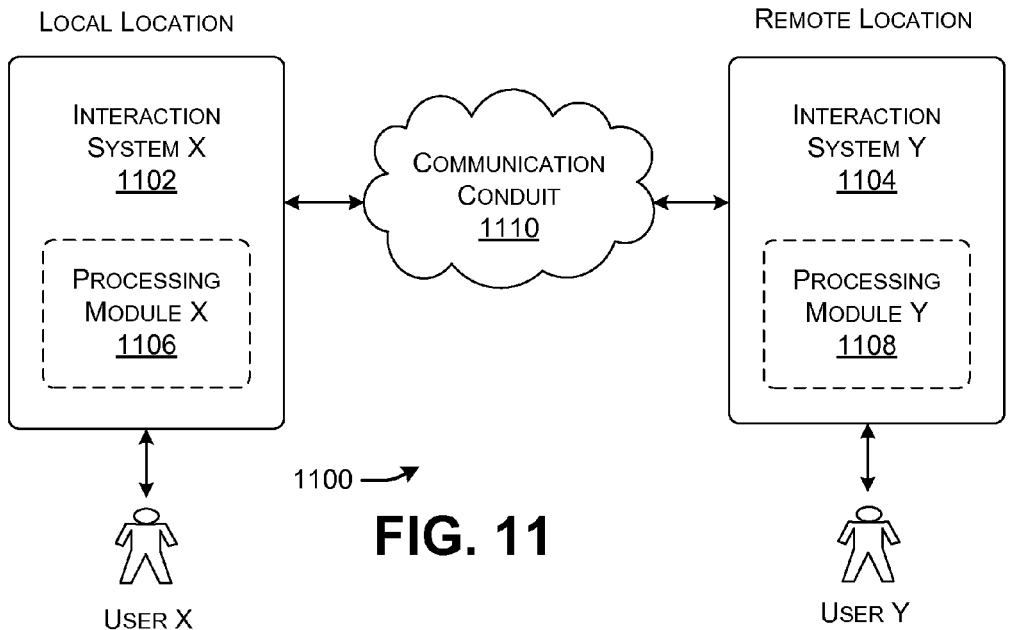
FIG. 11 shows an illustrative environment that incorporates two interaction systems, the first used by a local user and the second used by a remote user.

Advancing to FIG. 11, this figure shows an environment 1100 in which a local user (user X) operates a local interaction system 1102 and a remote user (user Y) operates a remote interaction system 1104. Each interaction system (1102, 1104) can include the full suite of functionality shown in FIG. 1. For instance, the local interaction system 1102 includes a local processing module 1106 and the remote interaction system 1104 includes a remote processing module 1108. A communication conduit 1110 connects the local interaction system 1102 and the remote interaction system 1104. The communication conduit 1110 can include any mechanism for exchanging information between the two interaction systems (1102, 1104), such as a local area network, a wide area network (e.g., the Internet), a point-to-point connection, and so on, governed by any protocol or combination of protocols. Although not shown, the environment 1100 can accommodate additional users that interact with additional interaction systems. Further, the environment 1100 of FIG. 11 can include standard videoconferencing technology, such as audio-visual equipment that allows the users to interact with each other.

Figure 12:
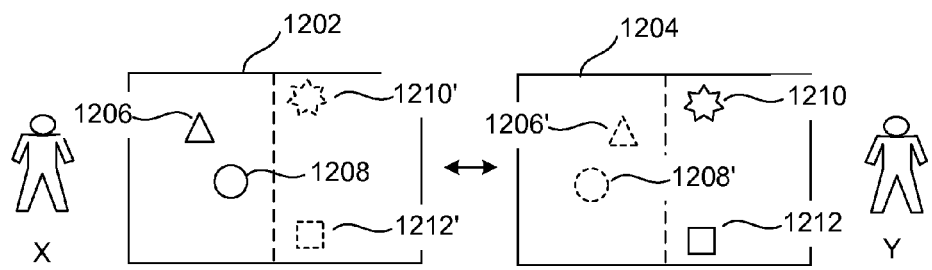
FIGS. 12 and 13 show two illustrative modes of operation of the environment shown in FIG. 11.

The environment 1100 shown in FIG. 11 can allow the local user and the remote user to generate and share 3D virtual objects for any purpose, such as to perform a shared task in a collaborative manner. The environment 1100 can operate in different modes. FIG. 12 shows a first mode of operation. In this mode, any physical object that user X places on his interactive surface 1202 appears as a 3D virtual object on user Y's interactive surface 1204, and any physical object that user Y places on his interactive surface 1204 appears as a 3D virtual object on user X's interactive surface 1202. For example, user X has placed physical objects 1206 and 1208 on the interactive surface 1202; these appear as 3D virtual objects 1206' and 1208' on user Y's interactive surface 1204. User Y has placed physical objects 1210 and 1212 on the interactive surface 1204; these appear as 3D virtual objects 1210' and 1212' on user Y's interactive surface 1202.

Figure 13:
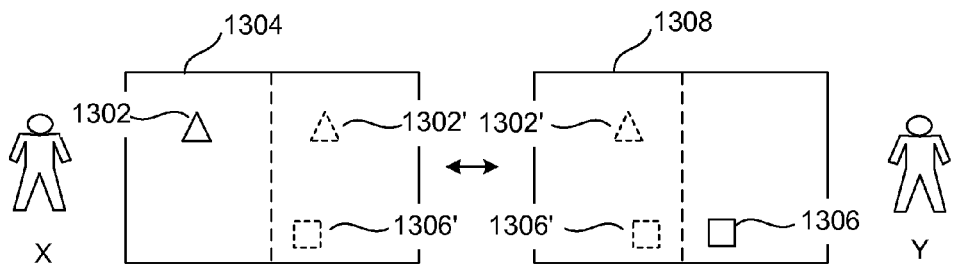

FIG. 13 shows a second mode of operation. In this mode, all 3D virtual objects that have been created by any user appear to all users. For example, user X has placed a single physical object 1302 on his interactive surface 1304 and user Y has placed a single physical object 1306 on his interactive surface 1308. The corresponding virtual objects 1302' and 1306' appear on both interactive surfaces (1304, 1308).

The approaches described in FIGS. 12 and 13 provide a convenient mechanism by which the local user can convey the shape of a physical object to the remote user across a distance, and vice versa. In addition, any user can manipulate a 3D virtual object in any manner (e.g., by rotating it), producing appropriate movement that can be observed by the other user. In another manner of operation, any user can generate a 3D virtual representation of a body part, such as a hand or a face, and then convey that virtual representation to the other user. For example, a user can generate a 3D virtual object that corresponds to a hand pointing to a physical object, and then convey that object to the other user. This has the effect of virtually "reaching out" and making an expressive gesture to the other user. Indeed, in one implementation, the depth camera at each interaction system (1102, 1104) can form a representation of each user, such as the upper torso of each user. The environment 1100 can then transfer each representation to the other user, e.g., so that user X sees a lifelike representation of user Y, and vice versa.

The implementations and applications described above are representative, not exhaustive. The interaction system 100 can be implemented and used in yet other ways.

B. Illustrative Processes

FIGS. 14-22 show procedures and accompanying examples which further explain one manner of operation of the interaction system 100 of FIG. 1. Since the principles underlying the operation of some parts of the interaction system 100 have already been described in Section A, certain operations will be addressed in summary fashion in this section.

Figure 14:
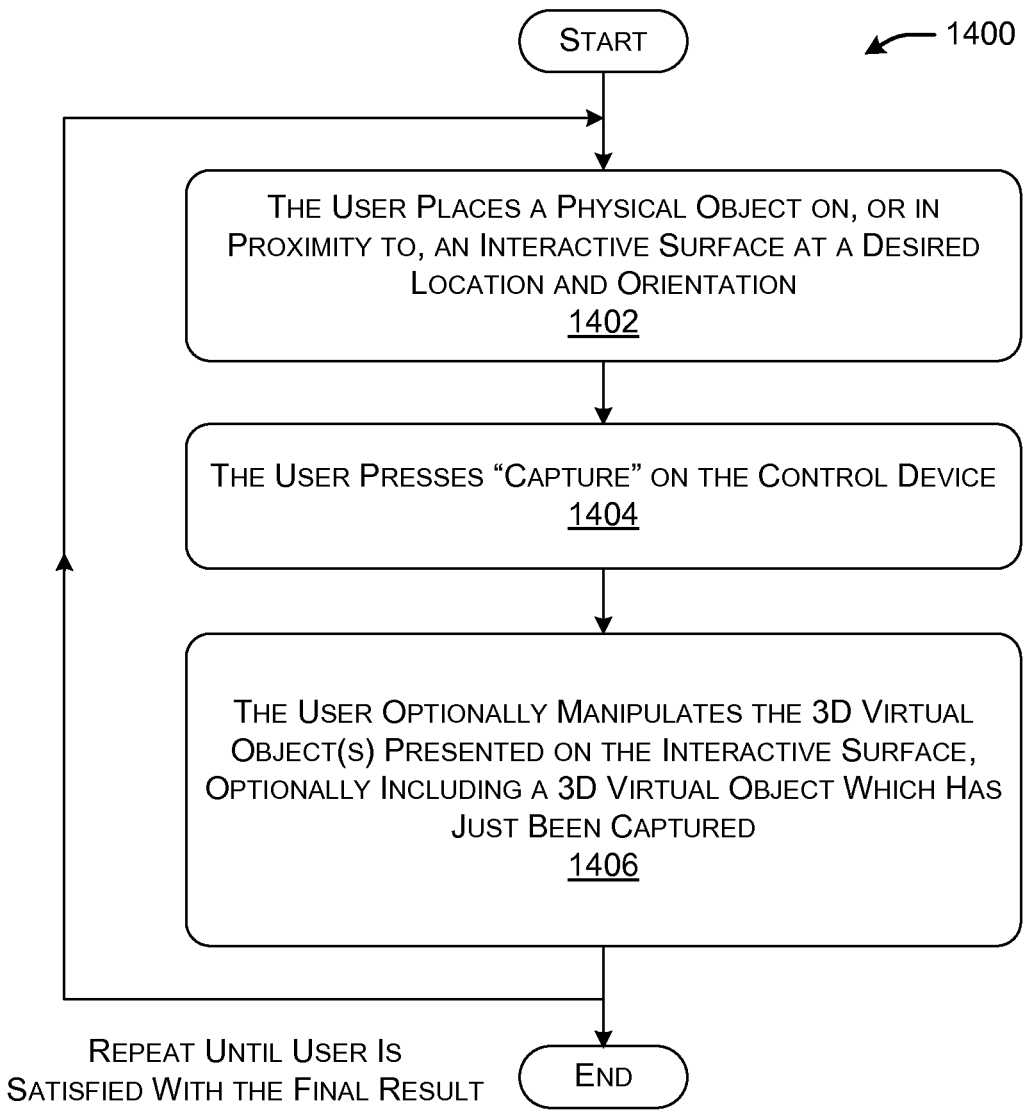
FIG. 14 shows an illustrative procedure for using the interaction system of FIG. 1, from the standpoint of the user.

Starting with FIG. 14, this figure is a procedure 1400 that represents an overview of one manner of operation of the interaction system 100 of FIG. 1, from the perspective of a user. In block 1402, the user places a physical object onto the interactive surface 102, such as an inanimate object, a body part, or combination thereof. This causes the interaction system 100 to generate and project a real-time presentation of a counterpart 3D virtual object. In block 1404, assume that the user at some point instructs the interaction system 100 to capture the physical object. This causes the interaction system 100 to produce a captured 3D virtual object, which appears on the interactive surface 102 along with the ongoing dynamic presentation. In block 1406, assume that the user next decides to manipulate any captured 3D virtual object that is presented on the interactive surface, including the 3D virtual object that has just been captured. The interaction system 100 responds by manipulating the 3D virtual object(s) in the desired manner. The loop in FIG. 14 indicates that the user can repeat the operations in blocks 1402-1406 any number of times to build a composite model from individual 3D virtual object building blocks.

Figure 15:
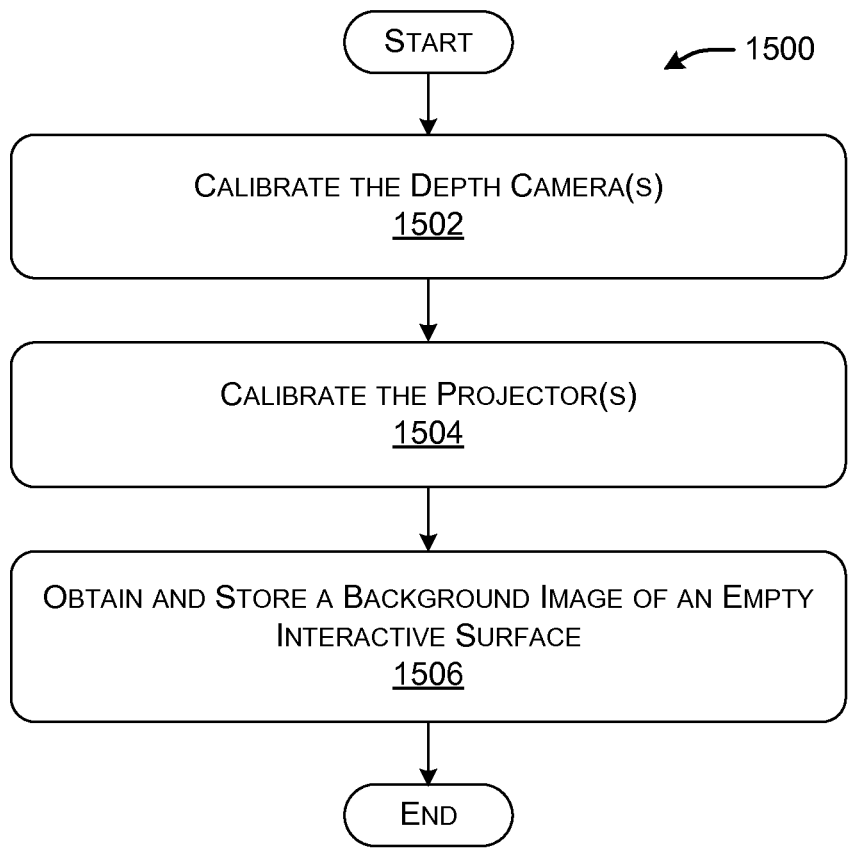
FIG. 15 shows an illustrative procedure for setting up the interaction system of FIG. 1.

FIG. 15 shows one possible procedure 1500 for setting up the interactive system 100. To begin with, in blocks 1504 and 1506, the user calibrates the depth camera 106, video camera 108, and projector 112 of FIG. 1 using any calibration technique, such as the technique described by the inventors in a different context in Andrew Wilson, et al., "Combining Multiple Depth Cameras and Projectors for Interactions On, Above and Between Surfaces," *Proceedings of the 23nd Annual ACM Symposium on User interface Software and Technology*, pp. 273-282.

Namely, in block 1502, the user first interacts with the calibration module 122 to calibrate the depth camera 106 (or plural depth cameras, if used). In one approach, the user can perform this task by placing reflective reference dots at various locations on the interactive surface 102, having known real-world positions. The user can then use the interaction system 100 to create a depth image of the interactive surface 102. That depth image will include representations of the reference dots. The calibration module 122 can then determine the distances between the depth camera 106 and each reference dot. The calibration can use this distance information, in turn, to derive the location and orientation of the depth camera 106. This, in turn, allows the interaction system 100 to subsequently transform position information in depth images to the real-world frame of reference of the interactive surface 102. The video camera 108 can be calibrated in a similar manner to the same real-world coordinate system of the interactive surface 102.

In block 1504, the user interacts with the calibration module 122 to calibrate the projector 112. In one approach, the user can perform this task by adding reflective reference dots at corresponding non-coplanar calibration locations that lie within the field of view of the depth camera 106 and video camera 108, and also within the field of projection of the projector 112. The calibration module 122 can use the images taken of this scene (that include the reference dots), together with the resultant projection of the scene onto the interactive surface 102, to determine the location and orientation of the projector 112. The end result of the calibration performed in blocks 1502 and 1504 is that the depth camera 106, video camera 108, and projector 112 will be calibrated to the same real-world frame of reference.

In block 1506, the interaction system 100 captures a background depth image of the interactive surface 102 without any objects (or user body parts) placed on, or in proximity to, the interactive surface 102, so that no such object appears within the field of capture of the cameras (106, 108). The interaction system 100 later uses this background image to subtract out static background portions of the interactive surface 102, leaving representations of physical objects that the user has placed on the interactive surface 102.

Figure 16:
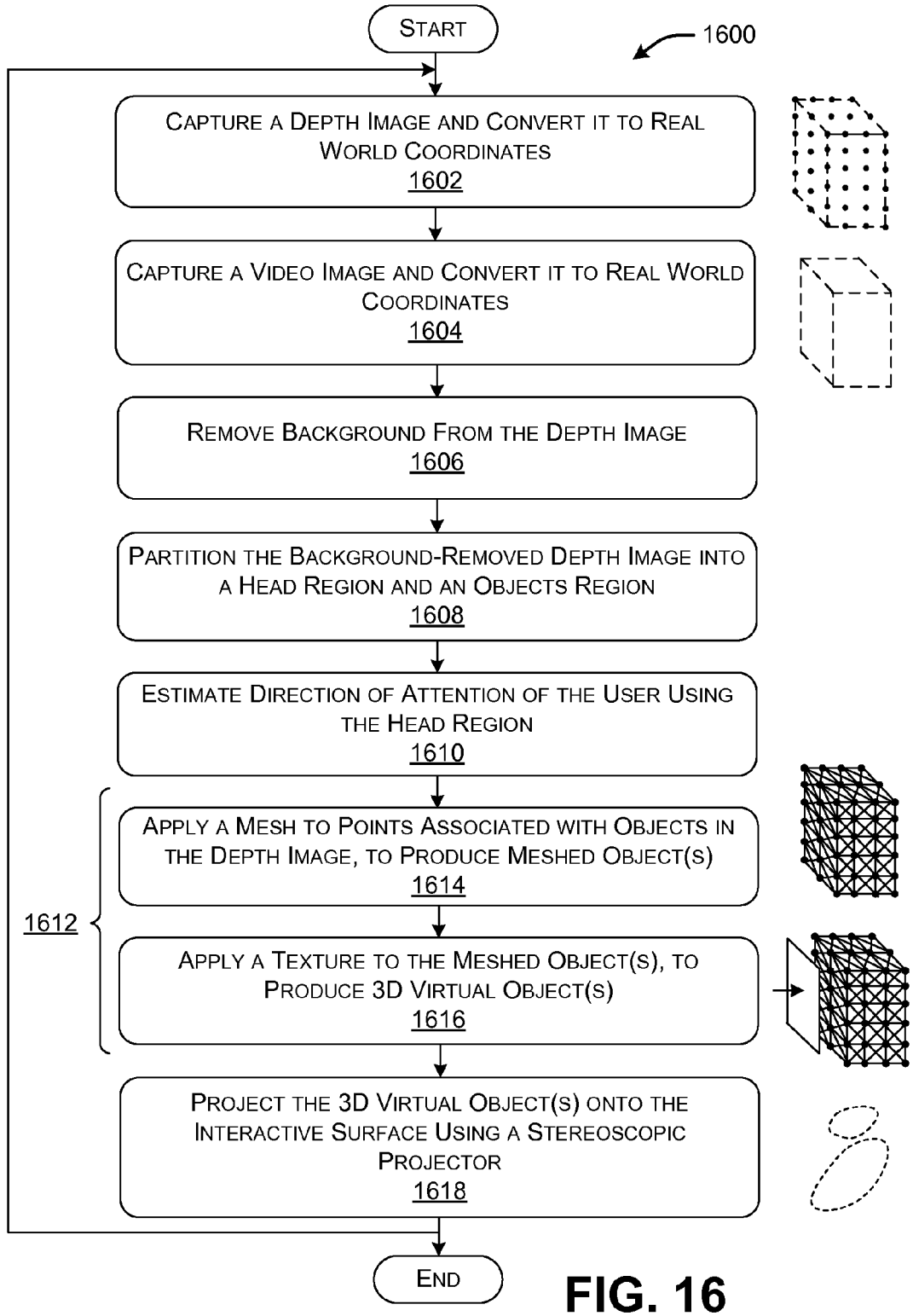
FIG. 16 shows an illustrative procedure for generating a 3D virtual object using the interaction system of FIG. 1.

FIG. 16 shows a procedure 1600 by which the generation module 120 (of FIG. 1) generates 3D virtual objects based on depth images and video images. To facilitate explanation, it will be assumed that the user has placed a single physical object on the interactive surface 102, which prompts the generation module 120 to generate a single 3D virtual object. In block 1602, the generation module 120 captures a depth image of the physical object and optionally converts position information contained therein to the real-world coordinate system of the interactive surface 102 (based on the calibration performed in FIG. 15). In block 1604, the generation module 120 captures a video image of the physical object and optionally converts position information contained therein to the real-world coordinate system of the interactive surface 102. Although FIG. 16 shows blocks 1602 and 1604 performed in series, these operations can be performed simultaneously.

In blocks 1606-1610, the generation module 120 begins operating on the depth image. To begin with, in block 1606, the generation module 120 subtracts the background image (generated in block 1506 of FIG. 15) from the depth image. This has the effect of removing extraneous background content from the depth image, to thereby emphasize the physical objects on the interactive surface 102. The generation module 120 can also remove any content that lies outside the workspace 202 shown in FIG. 2, as this content is not meaningful.

Figure 17:
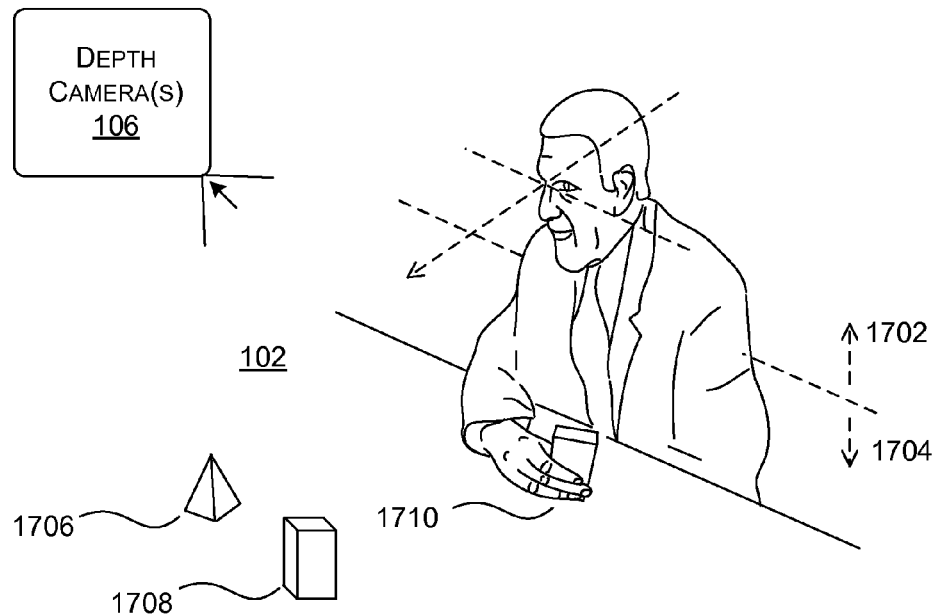
FIG. 17 shows a depiction of a user who is interacting with an interactive surface. The figure is a vehicle for demonstrating the manner in which the interaction system can determine the direction of attention of the user.

In block 1608, the generation module 120 partitions the background-removed depth image into a head region and an objects region. The ultimate objective of this operation is to identify portions of the depth image (in the head region) that likely correspond to the head of the user. For example, FIG. 17 shows an example in which the head region corresponds to region 1702 and the objects region correspond to region 1704. The head region includes the user's head. The objects region contains the interactive surface 102 and objects (1706, 1708, 1710) placed on the interactive surface 102.

In block 1610, the generation module 120 estimates the direction of the user's attention based on depth information in the head region. Different techniques can be used to achieve this objective. In one case, the generation module 120 can average different snapshots of the head region to derive a general estimate of the center of the mass that appears in the head region, which is presumed to correspond to the center of the user's head. In another case, the generation module 120 can perform pattern recognition to detect the user's head in the depth image and/or video image. In another case, the generation module 120 can perform pattern recognition based on the depth image and/or the video image to determine the direction of gaze of each individual eye. The direction of the user's attention will come into play in the application of the projective texturing technique, to be described below.

Figure 18:
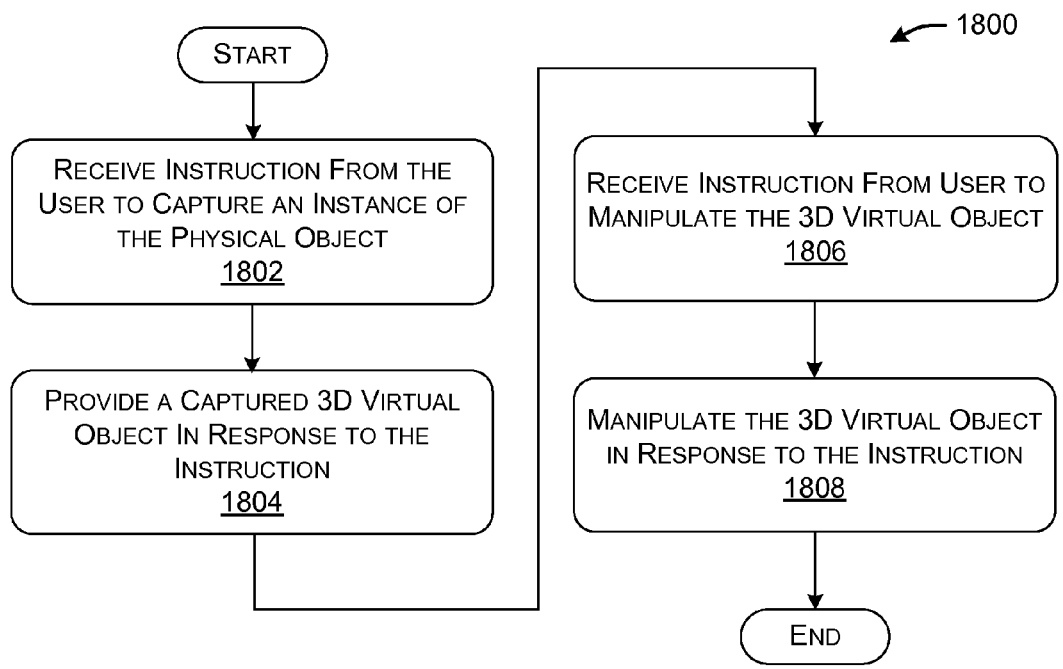
FIG. 18 shows an illustrative procedure for responding to a user's instruction to capture and manipulate a captured 3D virtual object.

Operation 1612 constructs at least one 3D virtual object based on an identified object in the objects region of the depth image, such as the physical object 1708 shown in FIG. 17. Generally, this operation entails estimating the structure of the 3D virtual object. For example, in one implementation, in block 1614, the generation module 120 applies a mesh to the points in the depth image that are associated with the physical object. From a high-level perspective, this has the effect of connecting the points in the depth image, to create a plurality of triangles. This produces a meshed object. In block 1616, the generation module 120 applies a texture, which is obtained from the video image, to the meshed object. This can be generally thought of as "pasting" the video image onto the surface of the meshed object. FIG. 18 will provide additional details on one manner in which this operation can be performed. But in general, this operation involves assigning texture coordinates (associated with the video texture) to the vertices of the meshed object.

The 3D virtual object can be formed in other ways. In another technique, for instance, the generation module 120 can identify a geometrical shape (e.g., geometrical structure) in the depth image without first forming a meshed object. For instance, the geometrical shape may be represented as a cloud of points in the depth image. The generation module 120 can then apply the texture to that geometrical shape.

In another technique, the generation module 120 (or some other module) can recognize the physical object based on the information obtained from the depth image and/or the video image. For example, the user may be building a composite model using a known set of possible physical objects. Here, the generation module 120 can be configured to recognize a particular physical object that the user has placed on the interactive surface 102 by comparing the shape of that object with shape profiles of the possible set of physical objects. In another case, the user may place a physical object on the interactive surface 102 that has a canonical shape, such as a cube, pyramid, sphere, etc. Here, the generation module 120 can recognize the nature of the physical object by its detected canonical shape. Still other techniques can be used to detect the nature of physical objects which are placed on the interactive surface 102. In any of these cases, the generation module 120 can build a model (or retrieve a previously built model) of the physical object without relying on the potentially noisy depth data in the depth image. Or model information can be used in combination with the depth data. However, to continue the concrete example set forth above, the remainder of the description will assume that the generation module 120 forms a meshed object.

Finally, in block 1618, the interaction system 100 projects the 3D virtual object produced in the preceding blocks onto the interactive surface 102 at a mirrored position with respect to the counterpart physical object. In one implementation, to perform this operation, the generation module 120 can generate two images for each instance of projection, the first corresponding to the left eye and the second corresponding to the right eye. In practice, the two versions of the images are the same, but shifted apart by a small amount.

In one case, the generation module 120 forms 3D virtual objects based on all physical objects that are placed on the interactive surface 102. As said, a physical object may correspond to an inanimate object (e.g., a cube), a user's body part (e.g., a hand), or a combination thereof. This means that, in one implementation, the generation module 120 will form a meshed object for a body part that is placed on the interactive surface 102. In some scenarios, the interaction system 100 projects all 3D virtual objects that have been generated for viewing by the user, including 3D virtual objects that correspond to body parts. But in other optional scenarios, the generation module 120 can remove any 3D virtual object in a virtual scene that corresponds to a body part (and/or any other 3D virtual object that has been assessed as extraneous). The generation module 120 can perform this operation, for instance, by recognizing the telltale shape of a hand-shaped 3D virtual object in the virtual scene and removing that 3D virtual object.

In another case, the generation module 120 analyzes the raw depth image to detect portions that may correspond to body parts, e.g., based on the above-described type of shape recognition. The generation module 120 can then forego the creation of 3D virtual objects of the body parts. In other words, the generation module 120 can forego the creation of meshed objects for the body parts.

FIG. 18 shows a procedure 1800 that describes one manner in which the generation module 120 reacts to commands provided via the control input device 116. In block 1802, the generation module 120 receives a command to capture a snapshot of a physical object. In block 1804, the generation module 120 responds to this instruction by producing a captured 3D virtual object. In block 1806, the generation module 120 receives a command to manipulate the captured 3D virtual object. In block 1804, the generation module 120 responds to this instruction by modifying the captured 3D virtual object in the instructed manner (e.g., by shifting it, rotating it, etc.).

Figure 19:
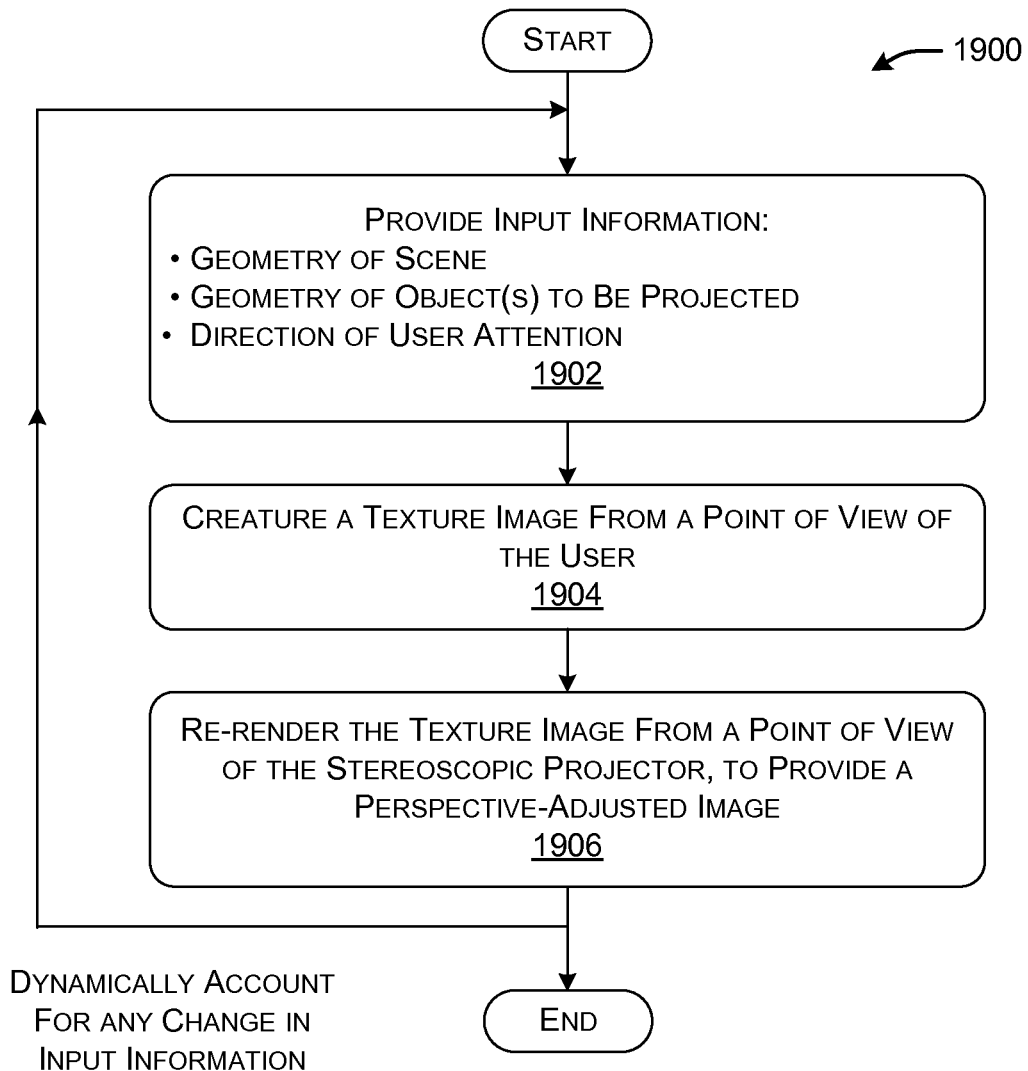
FIG. 19 shows an illustrative procedure for applying a projective texturing technique.

FIG. 19 shows a procedure for applying video textures to a scene using a projective texturing technique. Background information on projective texturing, as applied to conventional graphics applications (such as computer games), is available in a number of sources. The technique is described, for instance, by Mark Segal, et al., in "Fast Shadows and Lighting Effects Using Texture Mapping," *Proceedings of the 19th Annual Conference on Computer Graphics and Interactive Techniques,* 1992, pp. 249-252. Also note Frank Luna, Introduction to 3D Game Programming with Direct X 9.0c: A Shader Approach, Jones & Bartlett Publishers, Sudbury, Mass., 2006, pp. 562-564, and Marcus A. Magnor, "Video-based Rendering," A. K. Peters Ltd., Wellesley, Mass., 2005, pp. 56-57.

Block 1902 indicates that the generation module 120 obtains the information that it uses to perform the projective texturing technique (e.g., as per the processing set forth in FIG. 16). This information includes the geometry of the real scene on which the 3D virtual object is to be projected, obtained from the depth image. In some cases, this scene is a flat surface. In other cases, this scene has an irregular geometry, such as the user's cupped hand 802 shown in FIG. 8. Another item of information is the geometry of the 3D virtual object that is to be projected on the scene, such as the 3D virtual object 902 to be presented in the cupped hand 802 of the user in FIG. 9. Another item of information corresponds to the direction of attention of the user. This attention information has been extracted from the head region of the depth image in the manner described above in the context of FIGS. 16 and 17. Another item of information corresponds to the position and orientation of the projector 116.

In block 1904, the generation module 120 creates a texture image from a point of view of the user. This texture image contains objects that are seen from the user's perspective, e.g., based, in part, on the user's head position. In block 1906, the generation module 120 re-renders the texture image (provided in block 1904) from a point of view of the projector 112, e.g., by treating the user-perspective texture image obtained in block 1904 as an image to be projected over the real scene by the projector 116. This produces a representation of the 3D virtual object in the form of a perspective-adjusted image. FIG. 10 shows such a perspective-adjusted image that is presented on the user's hand (for some parts) and the interactive surface 102 (for other parts). From the perspective of anyone other than the user, the perspective-adjusted image may not be meaningful. But from the perspective of the user, the perspective-adjusted image creates the appearance of the 3D virtual object 902 shown in FIG. 9. In the above-described manner, the generation module 120 applies the projective texturing technique in a novel manner to a hybrid environment in which at least some 3D virtual objects derive from physical objects, and in which the 3D virtual objects are projected into a physical environment.

The procedure shown in FIG. 19 is repeated on a dynamic basis. This allows the generation module 120 to dynamically respond to changes in the user's head position, changes in the scene that is to receive the 3D virtual object, changes in the physical object, and/or other changes. From the perspective of the user, the 3D virtual object retains its visual integrity through all these changes.

Figure 20:
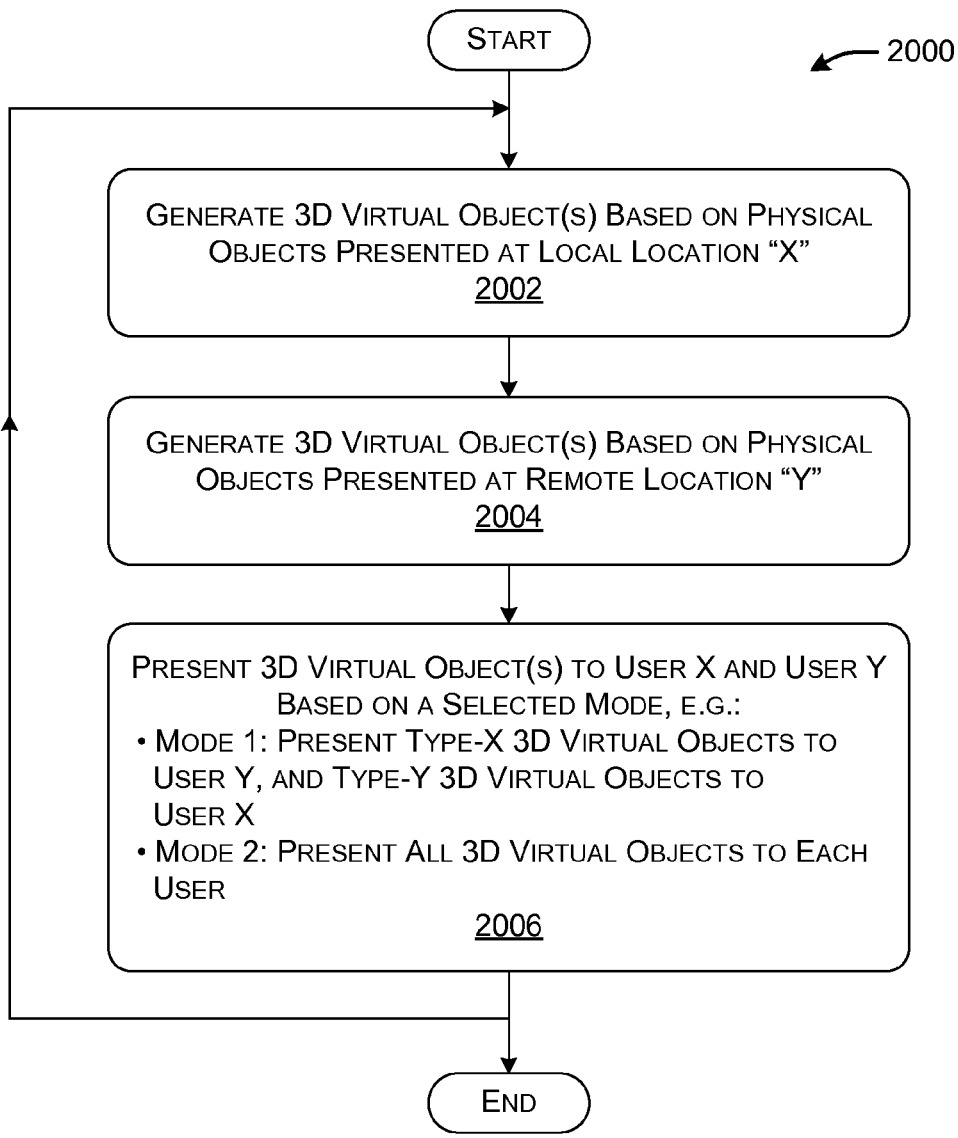
FIG. 20 shows an illustrative procedure for generating and sharing 3D virtual objects between a local user and a remote user.

FIG. 20 shows a procedure 2000 by which two or more participants (a local user and a remote user) can use the technology of FIG. 1 to share 3D virtual objects over a distance in a collaborative environment. In block 2002, a local interaction system (system X) generates at least one virtual object based on at least one physical object (optionally including a body part) that is presented at a local location. In block 2004, a remote interaction system (system Y) generates at least one virtual object based on at least one physical object (optionally including a body part) presented at a remote location.

In block 2006, the environment can present counterpart 3D virtual objects to the local user and the remote user. This function can be achieved in different ways for different modes of operation. In a first mode, the 3D virtual objects which appear to the local user correspond to the physical objects present at the remote location, and vice versa. In a second mode, the virtual objects which appear to each user correspond to physical objects presented at both the local and remote locations.

Figure 21:
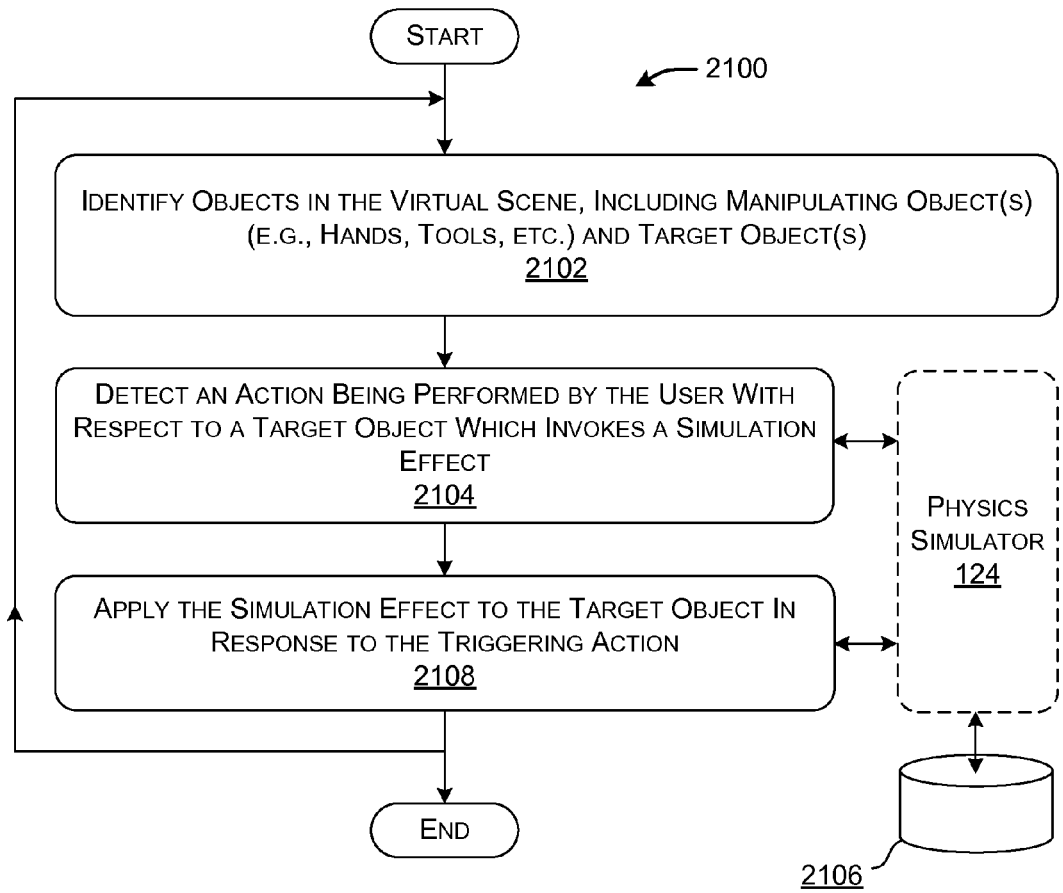
FIG. 21 shows an illustrative procedure for generating a simulation effect in response to a triggering action performed by the user with respect to a 3D virtual object.

FIG. 21 shows a procedure 2100 that describes one manner of applying simulation effects to a 3D virtual object. In block 2102, the generation module 120 can generate a virtual scene in the manner described above (e.g., with respect to FIG. 16). That virtual scene may include one or more objects ("manipulating objects") that cause changes in one or more other objects ("target objects"). In the following, assume that there is only one manipulating object that acts on a single target object. For example, the manipulating object may correspond to a hand of the user (or other body part) and/or a tool being manipulated by the user, etc. The manipulating object can be represented as a 3D virtual object, raw depth information, or other information. The target object can correspond to a 3D virtual object. The target object may originate from a previously captured physical object. In addition, or alternatively, the target object may have no physical counterpart; for instance, the generation module 120 can generate the target object based on a stored model.

In block 2104, the physics simulator 124 examines the manner in which the manipulating object (as controlled by the user) interacts with the target object. Based on this analysis, the physics simulator 124 determines whether the user has performed (or is performing) an action that corresponds to a telltale effect-inducing action. Namely, such an action is an action that will invoke the generation and application of a corresponding simulation effect. In one case, the physics simulator 124 can perform this operation by comparing information regarding the user's action to a library of patterns that describe telltale actions provided in a data store 2106. Representative telltale actions can include a grasping and moving motion, a striking or poking motion, a twisting motion, a bending motion, a squeezing motion, a cutting motion, a throwing motion, a flicking motion, a tearing motion, and so on. In addition, or alternatively, the user can also expressly inform the physics simulator 124 of what type of action he or she will be performing.

In bock 2108, if such a telltale action is detected, the physics simulator 124 generates an appropriate simulation effect and applies that effect to the target object. Again, the simulation effect can vary depending on the corresponding action that has been performed. For a striking action, the physics simulator 124 deforms the target object (e.g., to simulate a dent in the counterpart physical object). For a cutting action, the physics simulator 124 can partition the target object into two parts. For a grasping and moving action, the physics simulator 124 moves the target object in an appropriate manner. As noted in Section A, the physics simulator 124 can rely on any simulation algorithm(s) to perform the operations in block 2108. After the effect is applied, the generation module 120 instructs the projector 112 to project the resultant modified target object onto the interactive surface 102, where the effect is made visible to the user.

Figure 22:
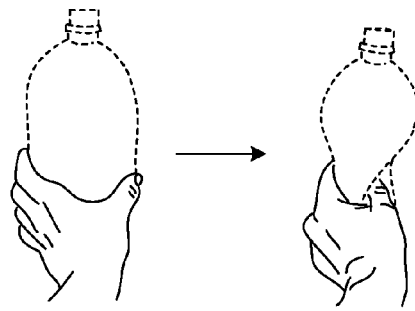
FIG. 22 is a demonstration of a simulated deformation effect.

FIG. 22 shows one example of a simulation effect that the interaction system 100 can apply. In this case, the user performs a telltale gesture by squeezing a virtual deformable bottle. Here, a 3D virtual object that corresponds to the user's hand constitutes the manipulating object; the 3D virtual object that corresponds to the bottle represents the target object. In response to detecting this telltale action, the physics simulator 124 can deform the sides of the virtual bottle in the manner indicated in FIG. 22. This is a physical effect that mirrors a physical reaction that a user would expect to achieve upon squeezing a real deformable bottle. But the physics simulator 124 can also apply non-realistic and fanciful effects.

C. Representative Processing Functionality

FIG. 23 sets forth illustrative electrical data processing functionality 2300 (also referred to herein a computing functionality) that can be used to implement any aspect of the functions described above. For example, the processing functionality 2300 can be used to implement any aspect of the interaction system 100 of FIG. 1, such as the processing module 118. In one case, the processing functionality 2300 may correspond to any type of computing device that includes one or more processing devices. In all cases, the electrical data processing functionality 2300 represents one or more physical and tangible processing mechanisms.

The processing functionality 2300 can include volatile and non-volatile memory, such as RAM 2302 and ROM 2304, as well as one or more processing devices 2306 (e.g., one or more CPUs, and/or one or more GPUs, etc.). The processing functionality 2300 also optionally includes various media devices 2308, such as a hard disk module, an optical disk module, and so forth. The processing functionality 2300 can perform various operations identified above when the processing device(s) 2306 executes instructions that are maintained by memory (e.g., RAM 2302, ROM 2304, or elsewhere).

More generally, instructions and other information can be stored on any computer readable medium 2310, including, but not limited to, static memory storage devices, magnetic storage devices, optical storage devices, and so on. The term computer readable medium also encompasses plural storage devices. In all cases, the computer readable medium 2310 represents some form of physical and tangible entity.

The processing functionality 2300 also includes an input/output module 2312 for receiving various inputs (via input modules 2314), and for providing various outputs (via output modules). One particular output mechanism may include a presentation module 2316 and an associated graphical user interface (GUI) 2318. The processing functionality 2300 can also include one or more network interfaces 2320 for exchanging data with other devices via one or more communication conduits 2322. One or more communication buses 2324 communicatively couple the above-described components together.

The communication conduit(s) 2322 can be implemented in any manner, e.g., by a local area network, a wide area network (e.g., the Internet), etc., or any combination thereof. The communication conduit(s) 2322 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing an interactive experience to a user using an interaction system, comprising:
    capturing a depth image of a physical object placed on, or in proximity to, a surface using a depth camera, the depth image comprising information regarding the distance of different parts of the physical object to the depth camera;
    capturing a video image of the physical object using a video camera, wherein the depth camera is not the video camera, and wherein the video image is captured in conjunction with the depth image;
    generating a 3D virtual object which is a counterpart of the physical object based on the depth image and the video image; and
    projecting, using a 3D projector, the 3D virtual object on, or in proximity to, the surface.

2. The method of claim 1, further comprising dynamically repeating said capturing of the depth image, capturing of the video image, generating the 3D virtual object, and projecting the 3D virtual object, to provide a dynamic and interactive experience to the user.

3. The method of claim 1, further comprising:
receiving an instruction from the user to capture an instance of the physical object; and
capturing the instance of the physical object in response to the instruction, to provide a captured 3D virtual object.

4. The method of claim 3, further comprising:
receiving an instruction from the user to manipulate the generated 3D virtual object; and
manipulating the generated 3D virtual object in response to the instruction to manipulate.

5. The method of claim 4, further comprising using said capturing and manipulating to aggregate two or more 3D virtual objects into a composite object, said two or more 3D virtual objects being derived from one or more physical objects.

6. The method of claim 1, further comprising removing background from the depth image using a previously-captured background image.

7. The method of claim 1, further comprising, prior to generating the 3D virtual object:
partitioning the depth image into a head region and an objects region; and
estimating a direction of attention of the user based on the head region.

8. The method of claim 1, wherein said generating of the 3D virtual object involves:
identifying a geometrical shape based on points associated with the depth image; and
applying a texture, obtained from the video image, to the geometrical shape, to add an appearance to the geometrical shape.

9. The method of claim 1, wherein said generating of the 3D virtual object involves:
creating a texture image from a point of view of the user; and
re-rendering the texture image from a point of view of the 3D projector, to provide a representation of the 3D virtual object in a form of a perspective-adjusted image,
said creating and re-rendering taking into account at least a geometry of a scene on which the 3D virtual object is to be projected, as represented in the depth image.

10. The method of claim 1, wherein said generating of the 3D virtual object involves using a projective texturing technique to generate a perspective-adjusted image based on a consideration of a direction of attention of the user and a position of the 3D projector.

11. The method of claim 10, wherein said projective texturing technique also takes into consideration a geometry of a scene on which the 3D virtual object is to be projected, as represented in the depth image.

12. The method of claim 11, wherein the geometry is irregular.

13. The method of claim 1, wherein said projecting of the 3D virtual object comprises projecting the 3D virtual object on, or in proximity to, the surface in a mirrored relationship with the physical object.

14. The method of claim 1, wherein the user is a local user who is present at a local location, and further comprising:
projecting the 3D virtual object to a remote user, who interacts with another interaction system at a remote location;
generating, using the other interaction system, another 3D virtual object based on a physical object that is present at the remote location; and
projecting the other 3D virtual object to the local user at the local location.

15. The method of claim 1, further comprising:
detecting a triggering action performed by the user with respect to the 3D virtual object that invokes a simulation effect, the triggering action being detected based on an interaction of a manipulating object with the 3D virtual object; and
applying the simulation effect to the 3D virtual object, the simulation effect defining a behavior of the 3D virtual object in response to the triggering action,
the manipulating object corresponding to a representation of at least one of: a body part of the user and a tool controlled by the user.

16. An interaction system, comprising:
an illumination source for projecting radiation onto a surface;
a depth camera for capturing a depth image of at least one physical object by receiving radiation, emitted by the illumination source, the depth image comprising information regarding the distance of different parts of the physical object to the depth camera, which illuminates the at least one physical object on, or in proximity to, the surface;
a video camera for capturing a video image of said at least one physical object, wherein the depth camera and the video camera are separate cameras, and wherein the video camera captures the video image of the at least one physical object in conjunction with the depth camera capturing the depth image of the at least one physical object;
a virtual scene generation module for generating at least one 3D virtual object based on the depth image and the video image; and
a stereoscopic projector for projecting said at least one 3D virtual object on, or in proximity to, the surface.

17. The interaction system of claim 16, further comprising a control device for manipulating said at least one 3D virtual object that has been projected on, or in proximity to, the surface.

18. The interaction system of claim 16, further comprising two or more depth cameras and two or more video cameras.

19. A computer readable storage device for storing computer readable instructions, the computer readable instructions providing a virtual scene generation module when executed by one or more processing devices, the computer readable instructions comprising:
logic configured to receive a depth image from a depth camera of a physical object placed on, or in proximity to, a surface, the depth image comprising information regarding the distance of different parts of the physical object to the depth camera;
logic configured to receive a video image from a video camera of the physical object, wherein the depth camera is not the video camera, and wherein the video camera captures the video image of the physical object in conjunction with the depth camera capturing the depth image of the physical object;
logic configured to generate a 3D virtual object, the 3D virtual object being a 3D representation of the physical object based on the depth image and the video image; and
logic configured to apply a texture, obtained from the video image, to the 3D virtual object in a form of a perspective-adjusted 3D image, the perspective-adjusted 3D image being projected, by a 3D projector, to a location on, or in proximity to, the surface.

20. The computer readable storage device of claim 19, wherein said logic configured to apply the texture comprises logic for using a projective texturing technique to generate the perspective-adjusted image based on: a consideration of a direction of attention of a user; a position of the 3D projector; and a geometry of a scene on which the 3D virtual object is to be projected, as represented by the depth image.

* * * * *